US008352529B2

(12) United States Patent
Furukawa et al.

(10) Patent No.: US 8,352,529 B2
(45) Date of Patent: Jan. 8, 2013

(54) MODULAR MULTIPLICATION CALCULATION APPARATUS USED FOR MONTGOMERY METHOD

(75) Inventors: Kazuyoshi Furukawa, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1152 days.

(21) Appl. No.: 12/218,060

(22) Filed: Jul. 11, 2008

(65) Prior Publication Data

US 2010/0023571 A1 Jan. 28, 2010

Related U.S. Application Data

(63) Continuation of application No. PCT/JP2006/300396, filed on Jan. 13, 2006.

(51) Int. Cl.
*G06F 7/38* (2006.01)
(52) U.S. Cl. ........................................................ 708/491
(58) Field of Classification Search ................ 708/491
See application file for complete search history.

(56) References Cited

U.S. PATENT DOCUMENTS

| 6,026,421 | A  | * | 2/2000  | Sabin et al. ................. 708/523 |
| 6,662,201 | B1 | * | 12/2003 | Kawamura ................... 708/491 |
| 7,266,577 | B2 | * | 9/2007  | Ikeda et al. .................. 708/491 |
| 7,509,486 | B1 | * | 3/2009  | Chin et al. ................... 713/151 |
| 2004/0167955 | A1 |   | 8/2004 | Okumura |
| 2005/0165876 | A1 |   | 7/2005 | Mukaida et al. |

FOREIGN PATENT DOCUMENTS

| EP | 1 560 110 A1 | 8/2005 |
| JP | 5-324277 | 12/1993 |
| JP | 8-265313 | 10/1996 |
| JP | 11-212456 | 8/1999 |
| JP | 2001-318785 | 11/2001 |
| JP | 2001-527673 | 12/2001 |
| JP | 2002-215386 | 8/2002 |
| JP | 2003-114618 | 4/2003 |
| WO | 98/50851 | 11/1998 |

OTHER PUBLICATIONS

Kazuyoshi Furukawa et al.; "Fast Implementation of RSA on the Itanium 2 Processor"; 2006 Symposium on Cryptography and Information Security, Hiroshima, Japan; The Institute of Electronics, Information and Communication Engineers; 2006; 8 pp.

(Continued)

*Primary Examiner* — Chuong D Ngo
(74) *Attorney, Agent, or Firm* — Staas & Halsey LLP

(57) ABSTRACT

REDC (A*B) is calculated for the values A and B by using a Montgomery's algorithm REDC. The part related to the A*B is performed by the three-input two-output product-sum calculation circuit. One digit $a_i$ of the value A, one digit $b_j$ of the value B and a carry value $c_1$ are input to the product-sum calculation circuit, and $a_i*b_j+c_1$ is calculated thereat. The higher-order digit of the r-adic two-digit of the calculation result is used as the carry value $c_1$, and the lower digit is used for a later calculation. Further, one digit $n_i$ of a modulo N for the REDC, a predetermined value m and a carry value $c_2$ are input into the product-sum calculation circuit, and $n*n_i+c_2$ is calculated thereat. The higher-order digit is used as the carry value $c_2$, and the lower digit is used for a later calculation.

16 Claims, 16 Drawing Sheets

OTHER PUBLICATIONS

Peng Ning et al.; "Design of High-Speed Montgomery Modular Multiplier"; 2004 Symposium on Cryptography and Information Security, Japan; The Institute of Electronics, Information and Communication Engineers; 2004; 7 pp.

Kazuyoshi Furukawa et al.; "A Fast RSA Implementation on Itanium 2 Processor"; Information and Communications Security, Lecture Notes in Computer Science, vol. 4307, Springer-Verlag; 2006; pp. 507-518.

International Search Report mailed Mar. 14, 2006 in connection with International Application No. PCT/JP2006/300396.

Cetin Kaya Koc et al., "Analyzing and Comparing Montgomery Multiplication Algorithms", IEEE Micro, vol. 16, No. 3, Jun. 1996, pp. 26-33.

European Search Report mailed May 12, 2011 in corresponding European Patent Application 06711681.4.

* cited by examiner

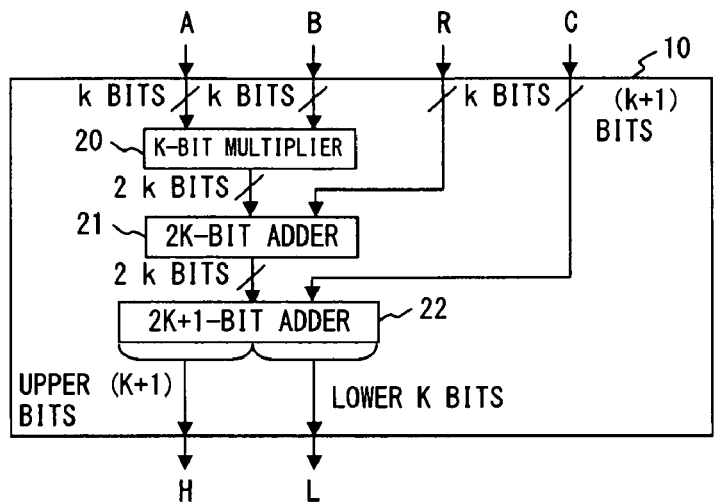
F I G. 2A
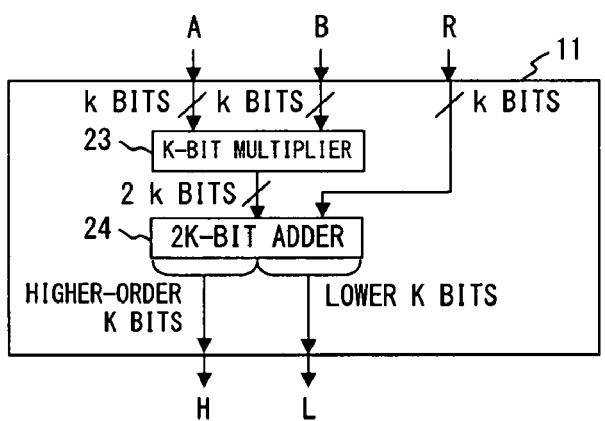
F I G. 2B

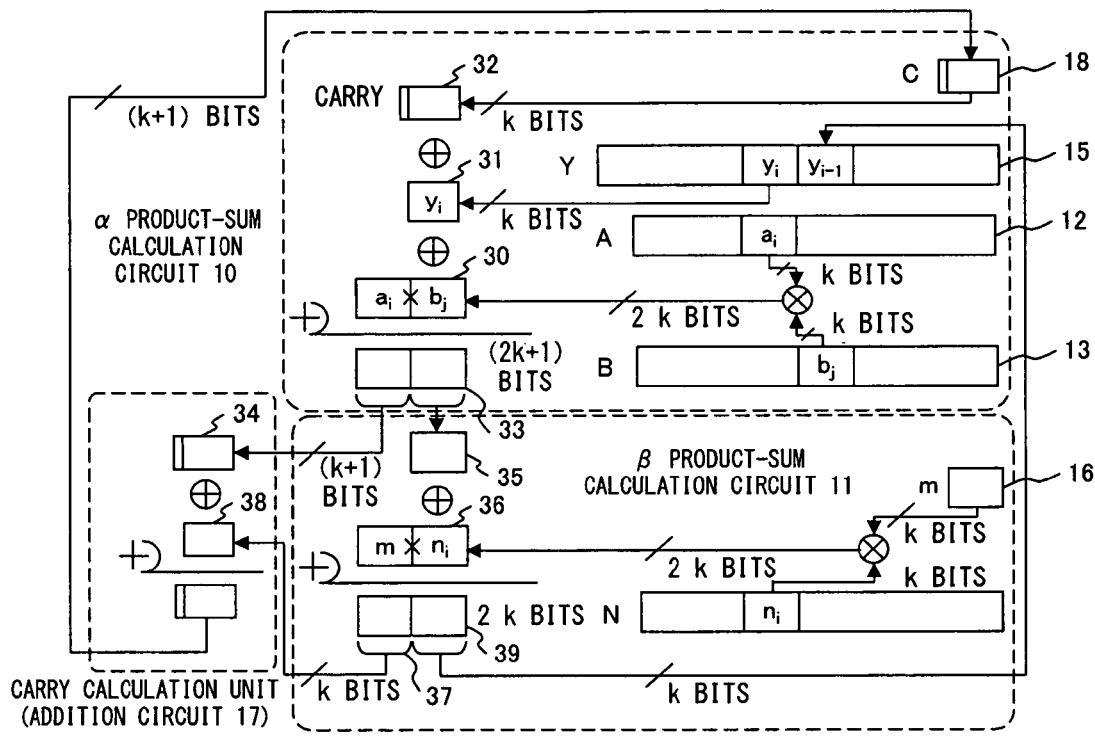
F I G. 3

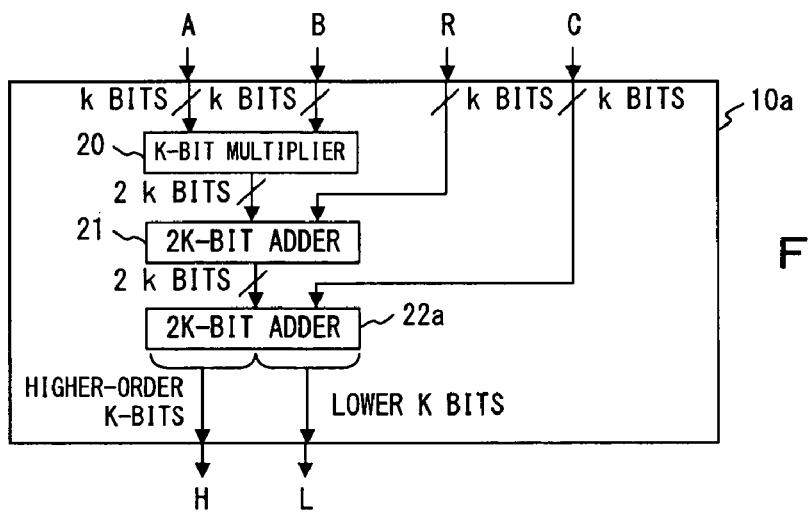
F I G. 5A
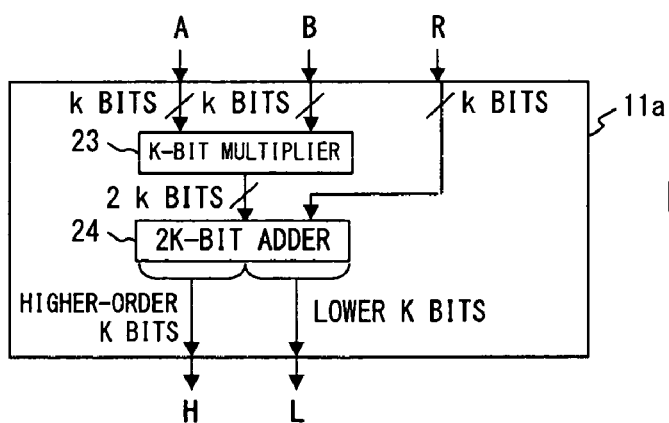
F I G. 5B

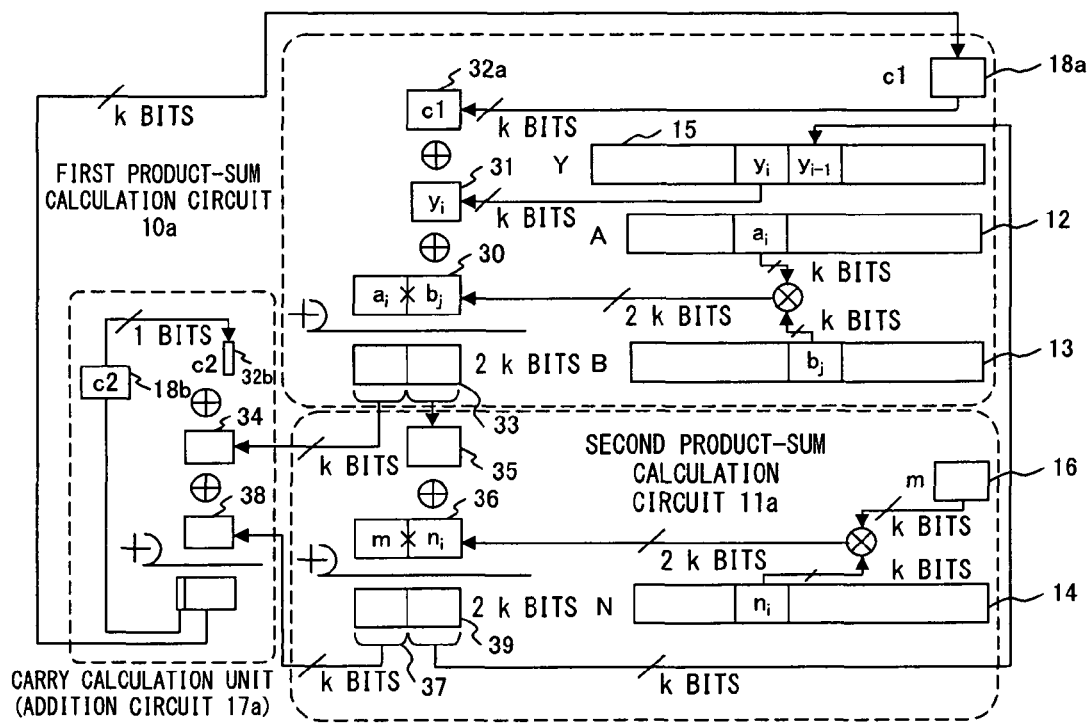
F I G. 6

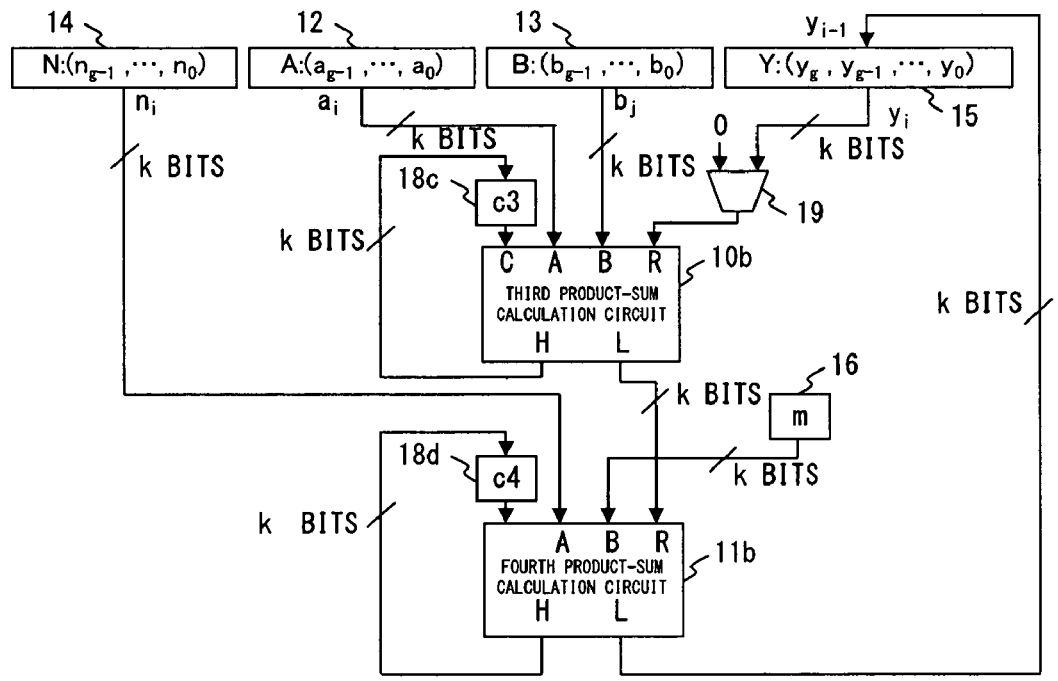
F I G. 7

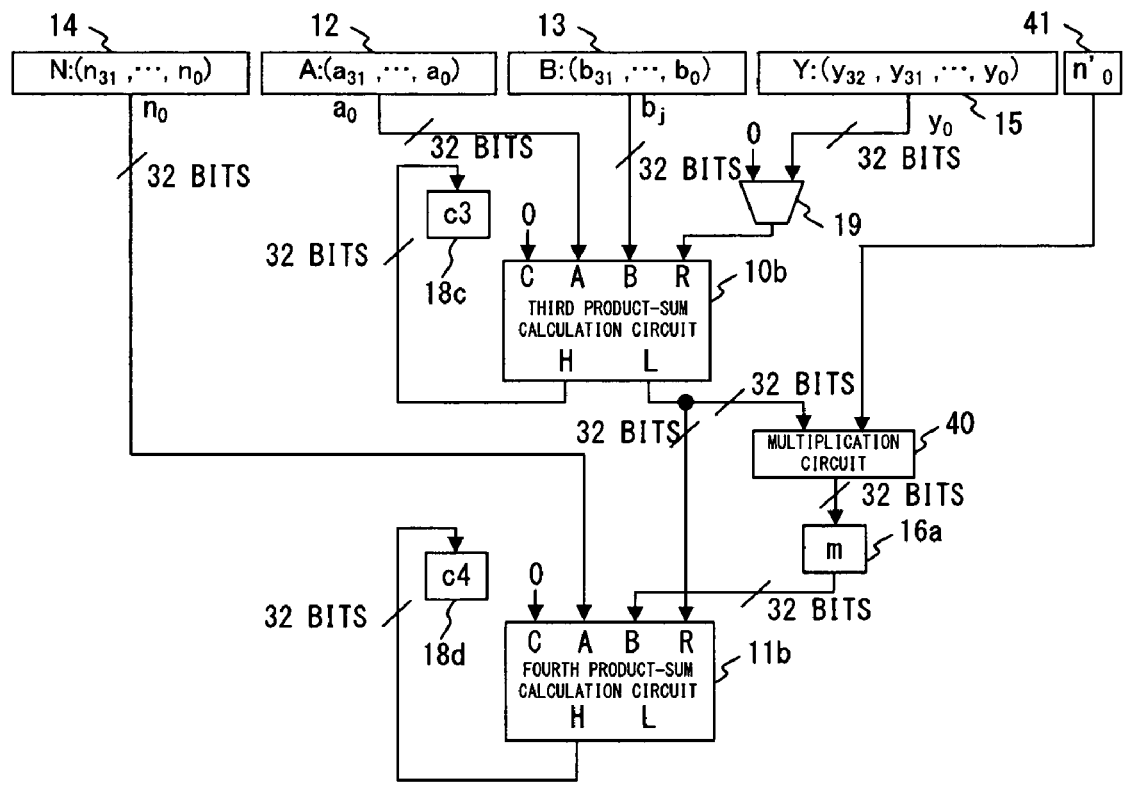
F I G. 10

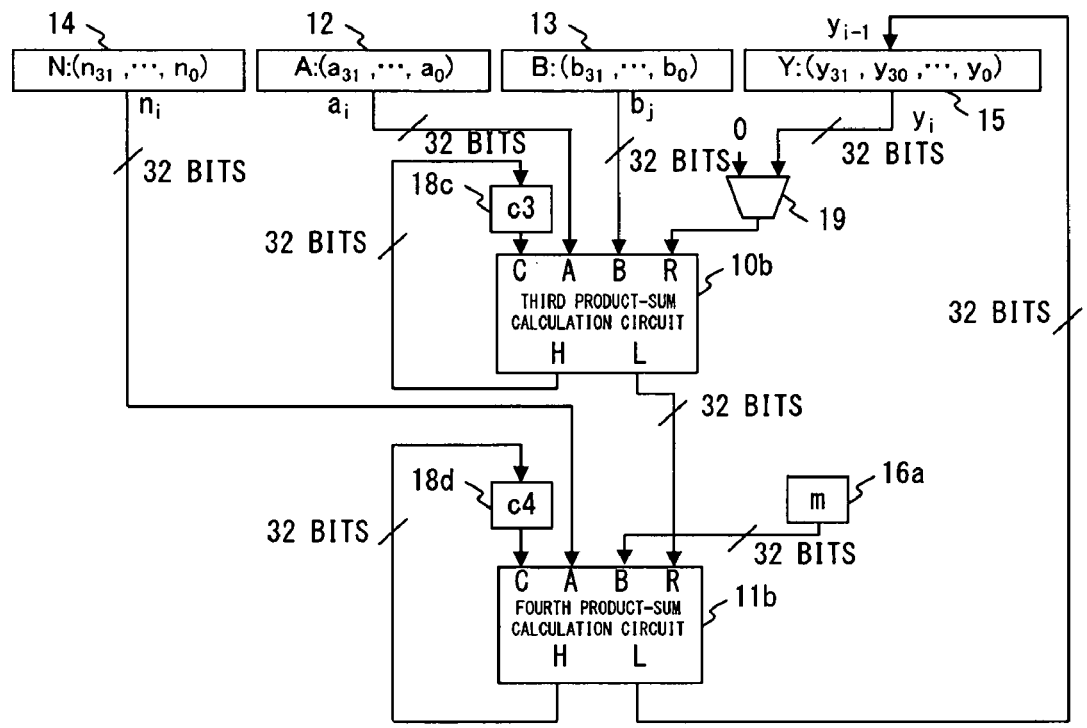
F I G. 1 1

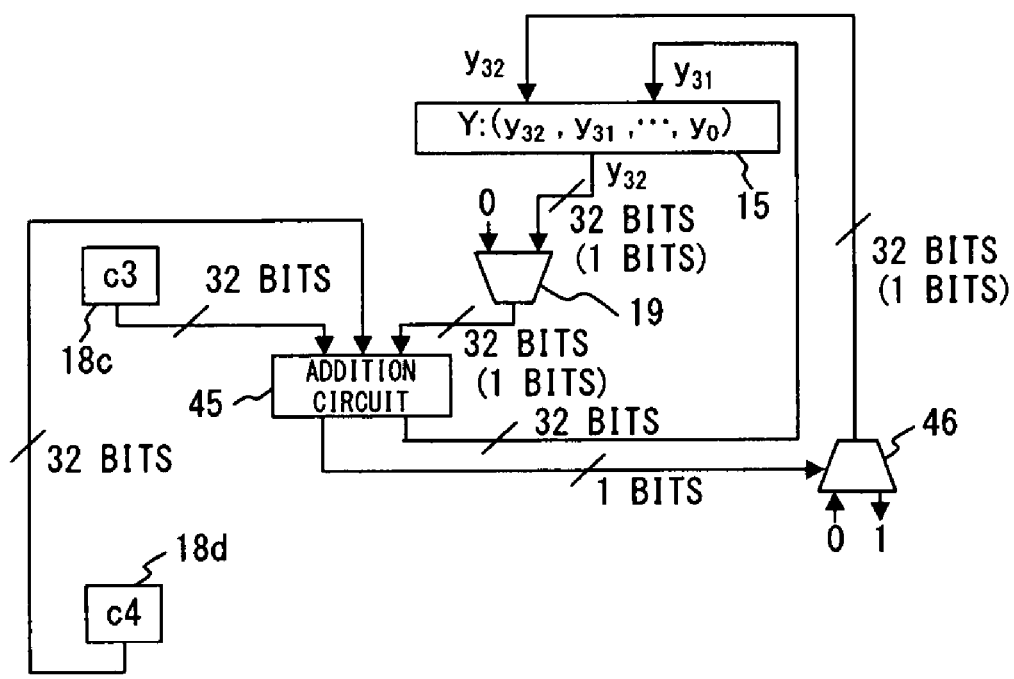
F I G. 1 2

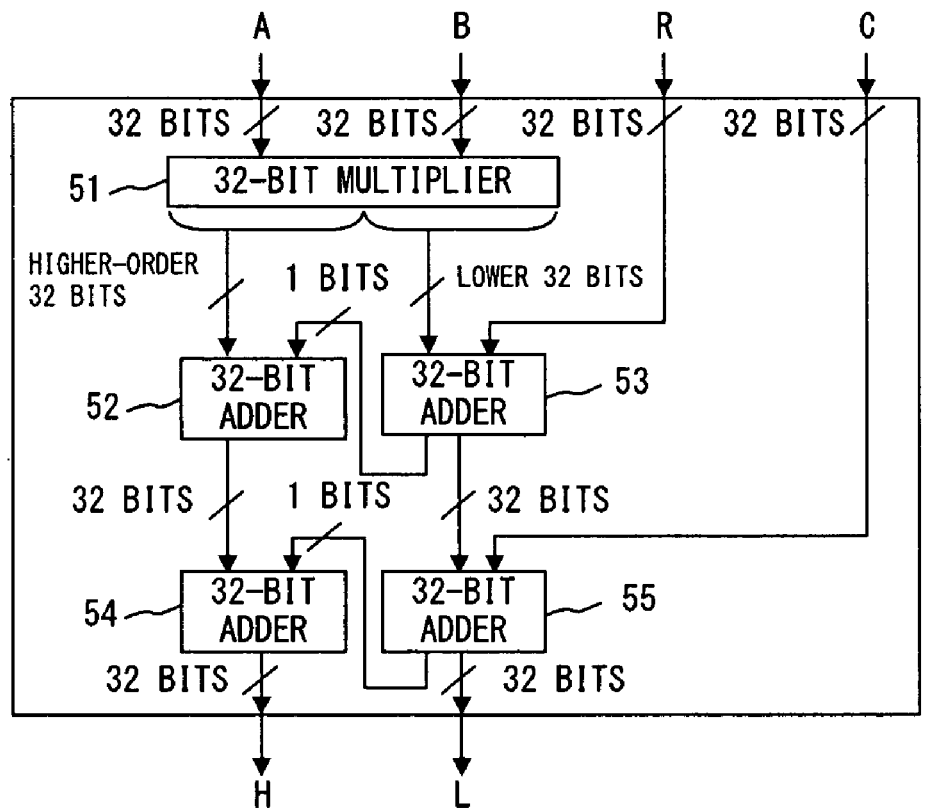
F I G. 13

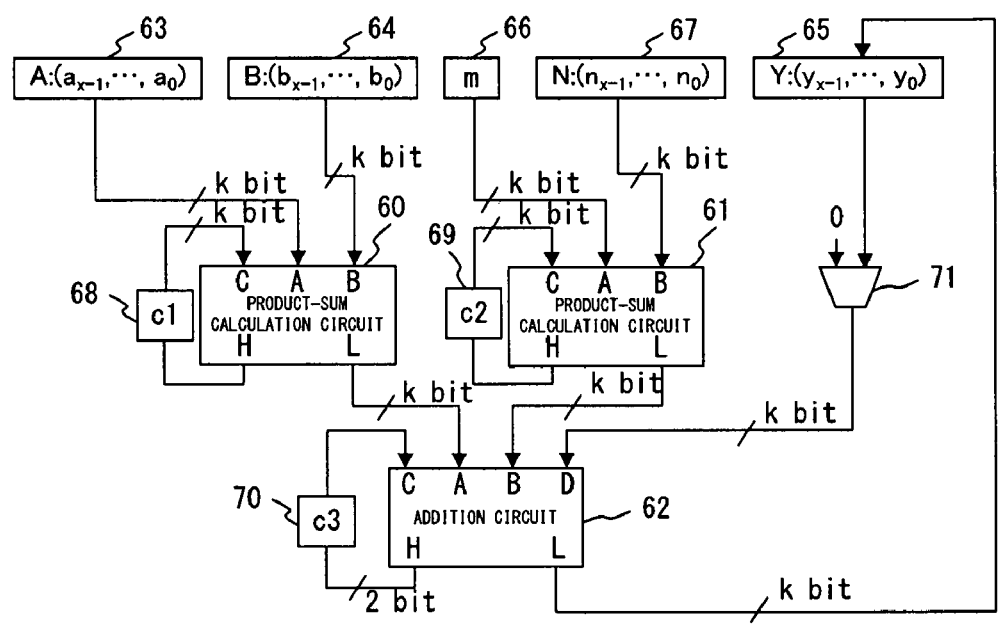
F I G. 1 4

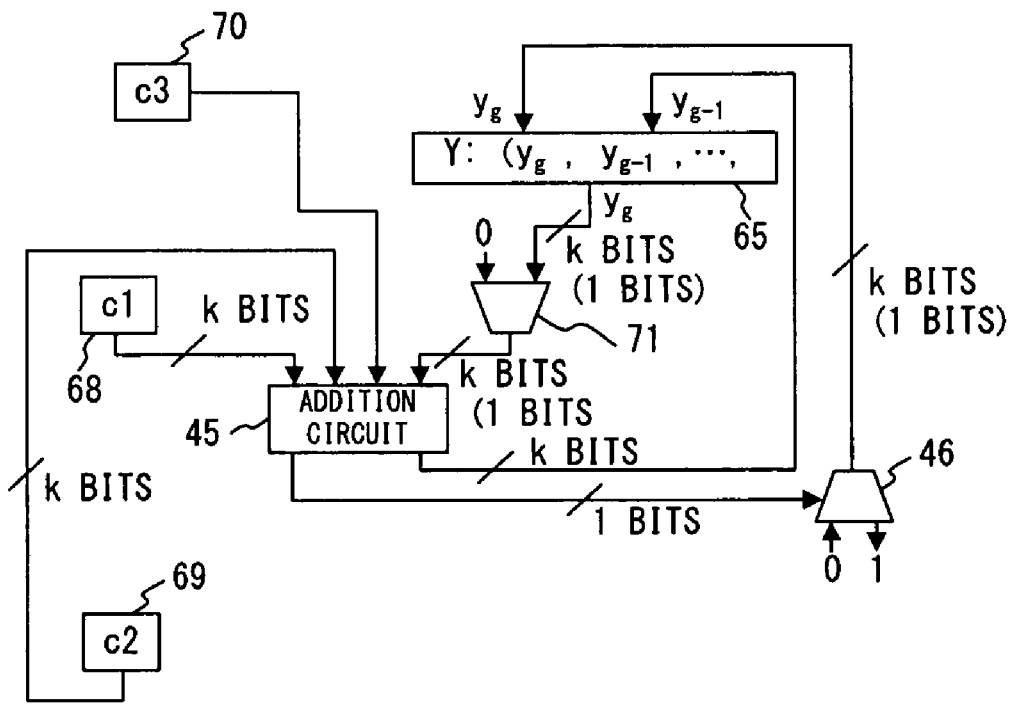
F I G. 16

MODULAR MULTIPLICATION CALCULATION APPARATUS USED FOR MONTGOMERY METHOD

CROSS REFERENCE TO RELATED APPLICATION

This application is a continuation application of International PCT Application No. PCT/JP2006/300396 which was filed on Jan. 13, 2006.

BACKGROUND OF THE INVENTION

1. Field of the Invention

The present invention relates to a modular multiplication calculation apparatus performing modular multiplication calculation in high speed by using a Montgomery's algorithm, for example, in RSA cryptographic processing for use in a public key cryptographic system.

2. Description of the Related Arts

The development of computer networks in recent years brings about a rapid increase in the chance of searching databases and that of transmitting and receiving digitized information such as electronic mails and electronic news. Furthermore, the provisions of services such as the online shopping are on the increase by using those pieces of information. Associated with such services, what have been pointed out are the problems of eavesdropping or tampering with digitized data available on a network and of receiving a service free or charge illegitimately by impersonating as a third person. Particularly in a network utilizing a radio frequency, a countermeasure to prevent these problems is strongly desired because eavesdropping is easy in such a network.

As a counter measure to these problems, an encrypted electronic mail and user authentication system, to both of which a cryptographic technique is applied, are proposed and introduced in various networks.

In this context, the encryption is deemed to be an indispensable technique in a computer network. One of such cryptographic techniques is a public key cryptographic system. What is desired for the public key cryptographic system is high speed processing because it requires a large volume of arithmetic operation processing for encryption and decryption, and various high-speed algorithms have accordingly been announced.

Encryption systems can generally be categorized into two systems, i.e., a secret key cryptographic system and a public key cryptographic system. The secret key cryptographic system is the system performing a cryptographic communication by a transmitter and a receiver both having the same cryptographic key. That is, in the secret key cryptographic system, the transmitter sends a certain message to the correspondent by encrypting it on the basis of a secret cryptographic key so that the receiver obtains information by reverting the cryptographic sentence back to the original message by using the cryptographic key. The public key cryptographic system is the system in which a transmitter transmits a message by encrypting it by using an open public key of a receiver so that the receiver decrypts the encrypted message by using her/his own secret key, thereby carrying out communications.

That is, in the public key cryptographic system, a public key is the key for encryption, while a secret key is the key for decrypting a cryptograph encrypted with a public key, and a cryptograph encrypted with the public key can be decrypted only by a secret key.

In the secret key cryptographic system, the number of keys which a person has to keep secretly is the number of correspondents and therefore the number of keys necessary for a network constituted by "n" persons is n(n−1)/2. Further, the system has a shortfall that a secret key has to be sent to the first-time correspondent by some means.

In order to eliminate the shortfall, a large scale network employs a method for equipping a key management center in the network, keeping only a secret key to be used between a person (i.e., a constituent of the network) and the center and obtaining, from the center, a secret key to be used between the constituent and correspondent when carrying out a cryptographic communication.

Meanwhile, in the public key cryptographic system, a key which a person is supposed to keep secretly is only her/his own secret key and therefore the number of keys required for a network constituted by "n" persons is n pieces.

Further, it requires only a public key to be sent to the first-time correspondent, and the used method is that a key management center is provided so as to register an "n" number of the public keys for users is registered in a public list and to obtain the public key of a correspondent from the center.

In this case, the center is only required to prevent unauthorized alteration of the public key and to not keep it secretly. The public key cryptographic system, however, has a larger number of bits than that for the public key cryptographic system, hence requiring a larger file size necessary to keep the key. Further, when performing authentication in the secret key cryptographic system, the adopted method is to compression-convert, for example, a message to be transmitted by a secret key, attach it to a sending message and send them together; and for the reception side likewise to compression-convert and compare them.

The problem is that the same key is used for transmission and reception, allowing the receiving person ("receiver") to alter the authentication data. In contrast, the public key cryptographic system allows only the sender encryption with a secret key, hence preventing an authorized alteration. The public key cryptographic system adopts the method in which the sender compression-converts a message, encrypts it with a secret key and sends a public key attached to a sending sentence, while the receiver decrypts the attached data with the sender's public key and compare the data with data which has likewise been compression-converted. In this case, the receiver cannot commit an unauthorized alteration.

As described above, the technique of the public key cryptographic system is deemed to be indispensable for an authentication system. The public key cryptographic system, however, has a shortfall of needing a large volume of calculation processing for encryption and decryption and there accordingly are many cases of combining the secret key cryptographic system, which allows fast processing, for encrypting a message with the public key cryptographic system for authentication.

Currently, the most prominent in the public key cryptographic system is the RSA cryptography invented by R. Rivest, A. Shamir and L. Adlman in 1977.

The basic principle of the RSA cryptography is as described in the following.

[The Basic Algorithm of RSA]

In an encryption key (e,N) and the corresponding decryption key (d,N), the e and N are public keys and d is a secret key.

Where a plain text is M and a cryptogram is C, the algorithm of an encryption E and that of a decryption D are represented by the following:

$$C = E(M) = M^e \bmod N$$

$$M = D(C) = C^d \bmod N;$$

where:
d*e=1 mod LCM{(p−1), (q−1)}
N=p*q
LCM: the least common multiple
p, q: large prime numbers Large integers, i.e., about 1024 bits, are usually used for the e, d, M and N and therefore even a use of high speed exponential calculation method requires about 1500 times of multiple precision multiplications and residue calculations for one RSA arithmetic operation.

Particularly for the reside calculation, a large number of high speed calculation methods have been proposed, such as an approximation method, a residue table method and Montgomery's algorithm, in order to speed up the arithmetic operation processing.

In order to process such power residue algorithms, represented by the RSA cryptography, which are frequently used for the public key cryptographic system, in high speed, a residue algorithm for each cycle of calculation must be processed in high speed.

Next is a description of a Montgomery's algorithm as one method for attaining the high speed processing of the residue arithmetic operation. For the Montgomery's algorithm, refer to: "Modulo Multiplication Without Trial Division", Peter L. Montgomery, Mathematics of Computation, Volume 44, Number 170, April 1985 pp. 519 through 528.

[Montgomery's Algorithm]

A Montgomery's algorithm is the algorithm using the fact that a use of a modulo N and a radix R (where R>N) which is relatively prime to the modulo N enables the calculation of $TR^{-1}$ mod N from a dividend T by dividing by a radix R, thereby performing a residue calculation without using the division by N.

In the following, let it be defined that N, N', R, $R^{-1}$ and T are integers, that the dividend T is $0 \leq T < R*N$, that the $R^{-1}$ is the inverse of the radix R on the modulo N, and that the relationship of $R*R^{-1} - N*N' = 1$ (where $0 \leq R^{-1} < N$, and $0 \leq N' < R$) applies.

Furthermore, when using a 2 to the power of exponential for the radix R, the division by the radix R can be substituted by a shift operation and therefore the high speed processing of the calculation of $T \to TR^{-1}$ mod N is enabled.

Next shows the algorithm REDC (T) of the $T \to TR^{-1}$ mod N as algorithm 1.

Here, it is proved that (T+m*N)/R is always divisible in the algorithm 1.

[Algorithm 1]

The algorithm Y=REDC (T) of $T \to TR^{-1}$ mod N is represented by the following:

$$M = (T \bmod R) * N' \bmod R$$

$$Y = (T + M*N)/R$$

if $Y \geq N$ then $Y = Y - N$
if $Y < N$ then return Y

One operation of REDC calculates only $TR^{-1}$ mod N, instead of a residue T mod N. Therefore, in order to calculate the residue T mod N, it only requires a REDC to be performed again by the product of REDC (T) and a pre-calculated $R^2$ mod N as shown below:

$$REDC(REDC(T)*(R^2 \bmod N)) = (TR^{-1} \bmod N)*(R^2 \bmod N)*R^{-1} \bmod N$$

$$= TR^{-1}*R^2*R^{-1} \bmod N$$

$$= T \bmod N$$

As such, the residue T mod N can be calculated.

[The Extension of REDC to a Multiple Precision Calculation]

Next is an extension of the algorithm of REDC in the case of the modulo N or a radix R being a multiple length, that is, a multiple precision.

If the modulo N and a radix R each is a multiple precision, the calculations of (T mod R)*N' and M*N is the processing of a multiple precision times multiple precision, requiring a general-purpose computer to endure very large processing volume and processing time. Therefore, what is shown next is an algorithm 2 extended so as to enable this part to be processed in multiple precision times single precision.

[Algorithm 2]

The algorithm extended for REDC to a multiple precision is as shown below. Where a dividend T, a parameter N" and an output-use variable Y each is an r-adic number, and represented as follows:

$$T = (t_{g-1}, t_{g-2}, \ldots, t_0)_r,$$

$$N = (n_{g-1}, n_{g-2}, \ldots, n_0)_r,$$

$$Y = (y_g, y_{g-1}, \ldots, y_0)_r,$$

$n'_0$,
$r = 2^k$,
$R = r^g$;

and the $TR^{-1}$ mod N can be calculated by a repetition process of j=0 through g−1 shown below as a multiple precision times single precision by using the following algorithm. Note that, here, "( )$_r$" indicates that it is a number expressed in an r-adic number. Further, here, the definitions are that the single precision is a single digit in an r-adic number and that, when using the same character, a capital letter is a multiple precision, a lowercase letter is a single precision and an affix in a lower case letter is the position of digit in a multiple precision:

Y=T
for j=0 to g−1

$$m = y_0 * n'_0 \bmod r$$

$$Y = Y + m*N$$

$$Y = Y/r$$

next
if $Y \geq N$ then $Y = Y - N$
if $Y < N$ then return Y

Carrying out the REDC again by using the product between thusly obtained $TR^{-1}$ mod N and the $R^2$ mod N pre-calculated as described above makes it possible to calculate the T mod N.

[The Extension of REDC to a Multiple Precision Modular Multiplication]

Next is to extend the REDC algorithm to a modular multiplication arithmetic operation.

In the above algorithm, while the input T is a value satisfying $0 \leq T < R*N$, there are many cases, in an actual RSA arithmetic operation, in which the input T is the multiplication result of integers A and B (where $0 \leq A$ and $B < N$).

In this case, the multiplication of the integers A and B is also a multiple precision integer arithmetic operation and therefore repeated calculations are performed similar to a multiple precision extension REDC.

In this case, if the multiplication and REDC are repeatedly calculated separately, a loss caused by a repeated calculation controls becomes twice.

Therefore, next shows an algorithm 3 extended so as to enable the multiplication and REDC in the same repeated loops.

[Algorithm 3]

The algorithm REDC (A*B) extending the REDC to a multiple precision modular multiplication is as follows.

Where two numbers A and B to be multiplied together, a parameter N', a Montgomery multiplication parameter $n'_0$ and an output-use variable Y each is an r-adic number and if they are represented by:

$A=(a_{g-1}, a_{g-2}, \ldots, a_0)_r,$ $B=(b_{g-1}, b_{g-2}, \ldots, b_0)_r,$ $N=(n_{g-1}, n_{g-2}, \ldots, n_0)_r,$ $Y=(y_g, y_{g-1}, \ldots, y_0)_r,$ $n'_0,$
$r=2^k,$
$R=r^g,$ it is possible to calculate $ABR^{-1}$ mod N as the calculation of a multiple precision times single precision through repeated process of j=0 through g−1 as shown below:

Y=0
for j=0 to g−1

$Y=Y+A*b_j$ $m=y_0*n'_0 \bmod r$ $Y=Y+m*N$ $Y=Y/r$ next
if Y≧N then Y=Y−N
if Y<N then return Y In the above algorithm 3, the A and N are multiple precision, while the $b_j$ and $n'_0$ are single precision, and the A and $b_j$ are multiplied together, thus meaning that it is calculated as that of a multiple precision times single precision.

It is possible to calculate AB mod N by performing an REDC again by using the product of thusly obtained $ABR^{-1}$ mod N and the pre-calculated $R^2$ mod N described above.

[Extension of REDC to a Multiple Precision Times Single Precision Processing]

While the algorithm 3 makes it possible to attain a multiple precision Montgomery modular multiplication in multiple precision times single precision, the arithmetic operation part of the multiple precision times single precision is extended to enable it as a combination with a calculation in single precision times single precision.

In this case, the calculation part of $A*B_j$ and that of m*N become repeated calculations and, if the two multiplications are repeatedly calculated separately in a similar manner to the above described case, a loss due to repeated calculation controls results in twice.

Accordingly, if the two multiplications are designed to be performed in the same repetition loop, such a loss can be reduced.

Next shows an algorithm 4 which is extended so as to enable two multiplications in the same repetition loop.

[Algorithm 4]

An algorithm REDC (A*B) extending the REDC to a single precision times single precision is shown below.

Where two numbers A and B to be multiplied together, a parameter N', a Montgomery multiplication parameter $n'_0$, an output-use variable Y and a carry variable C each is an r-adic number and if they are represented by:

$A=(a_{g-1}, a_{g-2}, \ldots, a_0)_r,$ $B=(b_{g-1}, b_{g-2}, \ldots, b_0)_r,$ $N=(n_{g-1}, n_{g-2}, \ldots, n_0)_r,$ $Y=(y_g, y_{g-1}, \ldots, y_0)_r,$ $C=(c_1, c_0)_r,$ $n'_0,$
$r=2^k,$
$R=r^g;$ and if the temporary variables of one digit of the r-adic are defined as tmp1, tmp2, tmp3 and tmp4, it is possible to obtain the $ABR^{-1}$ mod N by the calculation in a single precision times single precision through repeated processing of i and j shown below:

```
Y=0
   for j=0 to g−1          ................
      (tmp2,tmp1)_r =y_0 +a_0*b_j
      m=tmp1*n'_0 mod r
      (tmp4,tmp1)_r =tmp1+m*n_0     : Pre-core processing
      (c_1 ,c_0 )_r =tmp2+tmp4
      for i=0 to g−1        ................
         (tmp3,tmp2,tmp1)_r =y_i +(c_1 ,c_0 )_r +a_i *b_j
         (tmp4,y_{i−1} )_r =tmp1+m*n_i    : Core processing
         (c1 ,c0 )_r =tmp4+(tmp3,tmp2)_r
      next i               ................
      (c_1 ,c_0 )_r =(c_1 ,c_0 )_r +y_g
      y_{g−1} =c_0                          : Post-core processing
      y_g =c_1
   next j                  ................
   if Y≧N then Y=Y−N          : Correction processing
   if Y<N then return Y
```

Here, ( )$_r$ indicates that the variable of one digit of the r-adic number in parentheses is handled as a multiple precision. The tmp1 through tmp4, $c_0$ and $c_1$ each means that the number of multiple precision expressed in the r-adic number is divided into a plurality of bit strings and each of them is expressed by the value of a single precision. As an example, the tmp1 is the value of a single precision represented by the lower bit of the result from calculating a product and sum calculation $y_0+a_0*b_j$ in a single precision, and the tmp2 is the value of a single precision represented by the higher-order bit of the result from calculating the aforementioned product and sum calculation. Meanwhile, the tmp3 and c1 are represented by one digit of the r-adic number, with the content being the value of one bit.

For the output-use variable Y, the reason for storing an output in $y_{i-1}$, where a value to be used for a calculation is $y_i$, is that the function of Y=Y/r in the algorithm 3 is attained by thus storing it.

Further terminologies, for convenience, are such that the outside loop is called a j-loop, the inside loop is called an i-loop; the start from the beginning of the j-loop to the i-loop is called pre-core processing, the process within the i-loop is called core processing, and the end of the i-loop to that of the j-loop is called post-core processing.

FIG. 1 is the configuration diagram of a modular multiplication calculation apparatus executing the core processing of the above described algorithm 4.

Note that, in the entirety of the following descriptions, "k" of a k-bit is the number of bits representing the value of a single precision, with a specific example of k being 32 in the case of a 32-bit processor.

The modular multiplication calculation apparatus shown in FIG. 1 comprises an α product-sum calculation circuit 10 and a β product-sum calculation circuit 11 both for performing internal multiplication and addition; an A register 12 for retaining numbers A ($a_{g-1}$, $a_{g-2}$, ..., a0) as multipliers (or multiplicands); a B register 13 for retaining numbers B ($b_{g-1}$, $b_{g-2}$, ..., b0) as multipliers (or multiplicands); an N register 14 for retaining residue modulo N ($n_{g-1}$, $n_{g-2}$, ..., $n_0$); a Y register 15 for storing the lower k bits of the output of the β product-sum calculation circuit 11; an m register 16 for retaining a Montgomery parameter m; an addition circuit 17 as a carry calculation unit for adding the higher-order (k+1) bits of the output of the α product-sum calculation circuit 10 and the higher-order k bits of the output of the β product-sum calculation circuit 11; a C register 18 for storing the addition result of the addition circuit 17; and a selection circuit 19 for selecting an output by comparing the value of j with "0".

Meanwhile, FIGS. 2A and 2B show the respective internal comprisals of the (product-sum calculation circuit 10 and A product-sum calculation circuit 11. The α product-sum calculation circuit 10 comprises a k-bit multiplier 20 for multiplying the output of the A register 12 and that of the B register 13; a 2k-bit adder 21 for adding the output of the k-bit multiplier 20 and that of the selection circuit 19 (i.e., the Y register 15); and a 2k+1-bit adder 22 for adding the output from the 2k-bit adder 21 and that of the C register 18.

The β product-sum calculation circuit 11 comprises a k-bit multiplier 23 for multiplying the output of the N register 14 and that of the m register 16, and a 2k-bit adder 24 for adding the output of the k-bit multiplier 23 and that of the lower k bits of the α product-sum calculation circuit 10.

FIG. 3 is a description diagram showing the content of the core processing of the algorithm 4. In the α product-sum calculation circuit 10, the output $a_i$ (k bits) of the A register 12 and the output $b_j$ (k bits) of the B register 13 are multiplied, and the multiplication result (2k+1 bits; 33) is added to the output (k bits; 31) of the selection circuit 19 (i.e., the Y register 15) and the output (k+1 bits; 32) of the C register 18.

Note that the selection circuit 19 compares the value of j with "0" and, if the value of j is "0", outputs "0" to the α product-sum calculation circuit 10, while, if the value of j is not "0", outputs the stored value $y_i$ of the Y register 15 to the α product-sum calculation circuit 10.

The α product-sum calculation circuit 10 outputs the higher-order (k+1) bits (34) of the arithmetic operation result (2k+1 bits; 33) to the addition circuit 17 and outputs the lower k bits (35) of the arithmetic operation result to the β product-sum calculation circuit 11.

Within the β product-sum calculation circuit 11, the output $n_i$ (k bits) of the N register 14 and the output (k bits) of the m register 16 are multiplied, and the multiplication result (2k bits; 36) is added to the lower k-bit output of the α product-sum calculation circuit 10.

The β product-sum calculation circuit 11 outputs the higher-order k bits (38) of the arithmetic operation result (2k bits; 37) to the addition circuit 17 and outputs the lower k bits (39) to the Y register 15, which in turn stores the k-bit data as the value $y_{i-1}$.

The addition circuit 17 adds the output (k+1 bits; 34) of the α product-sum calculation circuit 10 and the output (k bits; 38) of the β product-sum calculation circuit 11, and outputs the addition result (k+1 bits) to the C register 18, which in turn stores it.

Next is a description of an algorithm 5 as a modified example of the algorithm 4.

[Algorithm 5]

Where two numbers A and B to be multiplied together, a parameter N, a Montgomery multiplication parameter $n'_0$ and an output-use variable Y each is an r-adic number and if they are represented by:

$$A = (a_{g-1}, a_{g-2}, \ldots, a_0)_r,$$

$$B = (b_{g-1}, b_{g-2}, \ldots, b_0)_r,$$

$$N = (n_{g-1}, n_{g-2}, \ldots, n_0)_r,$$

$$Y = (y_g, y_{g-1}, \ldots, y_0)_r,$$

$n'_0$,
$r = 2^k$,
$R = r^g$, and where the temporary variables of one digit of the r-adic number are tmp1, tmp2 and tmp4, and the carry variables are $c_1$ and $c_2$, it is possible to obtain an $ABR^{-1}$ mod N as the calculation in a single precision times single precision through the repeated processing of i and j shown below:

```
Y=0
   for j=0 to g-1          .................................
      (tmp2,tmp1)_r = y_0 + a_0*b_j
      m = tmp1*n'_0 mod r
      (tmp4,tmp1)_r = tmp1 + m*n_0        : Pre-core processing
      (c_2,c_1)_r = tmp2+tmp4
      for i=1 to g-1         .................................
         (tmp2,tmp1)_r = y_i + c_1 + a_i*b_j
         (tmp4,y_{i-1})_r = tmp1 + m*n_i    : Core processing
         (c_2,c_1)_r = tmp4+tmp2+c_2
      next i                  .................................
         (c_2,c_1)_r = (c_2,c_1)_r + y_g
         y_{g-1} = c_1                     : Post-core processing
         y_g = c_2
   next j                   .................................
   if Y≧N then Y=Y-N           : Correction processing
   if Y<N then return Y
```

Here, $(\ )_r$ indicates that the variable of the r-adic one digit in parentheses is handled as a multiple precision. Further, while the carry variables $c_2$ is represented by the r-adic one digit, the content is actually a value of one bit.

FIG. 4 is the configuration diagram of a modular multiplication calculation apparatus carrying out the core processing of the above described algorithm 5.

The modular multiplication calculation apparatus shown in FIG. 4 comprises a first product-sum calculation circuit 10a and a second product-sum calculation circuit 11a each for internally performing a multiplication and an addition; an A register 12 as a first register for retaining numbers A ($a_{g-1}$, $a_{g-2}$, ..., $a_0$) as multipliers (or multiplicands); a B register 13 as a second register for retaining numbers B ($b_{g-1}$, $b_{g-2}$, ..., $b_0$) as multipliers (or multiplicands); a Y register 15 as a third register for retaining the previous lower k-bit output of the second product-sum calculation circuit 11a and storing a posterior lower k-bit output; a $c_1$ register 18a as a fourth register for retaining a carry variable $c_1$; an N register 14 as a fifth register for retaining modulo N ($n_{g-1}$, $n_{g-2}$, ..., $n_0$); an m register 16 as a sixth register for retaining the parameter m of a Montgomery's algorithm; a c2 register 18b as a seventh register for retaining a carry variable c2; an addition circuit 17a as a carry calculation unit for adding the higher-order k-bit output of the second product-sum calculation circuit 11a and the output of the c2 register 18b; and a selection circuit 19 for comparing the value of j with "0" and selecting the output.

Meanwhile, FIGS. 5A and 5B show the internal comprisals of the first product-sum calculation circuit 10a and second product-sum calculation circuit 11a.

The first product-sum calculation circuit 10a comprises a k-bit multiplier 20, a 2k-bit adder 21 and a 2k-bit adder 22a. The k-bit multiplier 20 multiplies the output of the A register 12 and that of the B register 13; the 2k-bit adder 21 adds the output of the k-bit multiplier 20 and that of the selection circuit 19 (i.e., the Y register 15); and the 2k-bit adder 22a adds the output of the 2k-bit adder 21 and that of the $c_1$ register 18a.

Note that the example configuration shown in FIG. 5A is such as to add the output of the selection circuit 19 (i.e., the Y register 15) to the multiplication result first, and then add the output of the $c_1$ register 18a; it may be alternatively configured to add the output of the $c_1$ register 18a and then that of the selection circuit 19 (i.e., the Y register 15).

The second product-sum calculation circuit 11a comprises a k-bit multiplier 23 for multiplying the output of the N register 14 and that of the m register 16; and a 2k-bit adder 24 for adding the output of the k-bit multiplier 23 and the lower k-bit output of the first product-sum calculation circuit 10a.

FIG. 6 is a description diagram showing the content of the core processing of the algorithm 5.

Within the first product-sum calculation circuit 10a, the output $a_i$ (k bits) of the A register 12 and the output $b_j$ (k bits) of the B register 13 are multiplied and the multiplication result (2k bits; 30) is added to the output (k bits; 31) of the selection circuit 19 (i.e., the Y register 15) and the output (k bits; 32a) of the $c_1$ register 18a. Note that the selection circuit 19 compares the value of j with "0" and, if the value of j is "0", outputs "0" to the first product-sum calculation circuit 10a, while, if the value of j is not "0", outputs the stored value $y_i$ of the Y register 15 to the first product-sum calculation circuit 10a which in turn outputs the higher-order k bits (34) of the arithmetic operation result (2k bits; 33) to the addition circuit 17a and outputs the lower k bits (35) thereof to the second product-sum calculation circuit 11a.

Within the second product-sum calculation circuit 11a, the output $n_i$ (k bits) of the N register 14 and the output (k bits) of the m register 16 are multiplied and the multiplication result (2k bits; 36) is added to the output lower k bits (35) of the first product-sum calculation circuit 10a. The second product-sum calculation circuit 11a outputs the higher-order k bits (38) of the arithmetic operation result (2k bits; 37) to the addition circuit 17a and outputs the lower k bits (39) thereof to the Y register 15 which in turn stores the k-bit data as a value $y_{i-1}$.

The addition circuit 17a adds the output (k bits; 34) of the first product-sum calculation circuit 10a, the output (k bits; 38) of the second product-sum calculation circuit 11a and the output (1 bit; 32b) of the $c_2$ register 18b. It then respectively outputs, for use in the next cycle of arithmetic operations, the higher-order 1 bit of the addition result (k+1 bits) to the $c_2$ register 18b and the lower k bits thereof to the $c_1$ register 18a. The $c_1$ register 18a and $c_2$ register 18b respectively store them.

Next is a description of an algorithm 6 as further modification of the algorithm 5.

[Algorithm 6]

Where two numbers A and B to be multiplied together, a parameter N, a Montgomery multiplication parameter $n'_0$ and an output-use variable Y each is an r-adic number and if they are represented by:

$$A=(a_{g-1}, a_{g-2}, \ldots, a_0)_r,$$

$$B=(b_{g-1}, b_{g-2}, \ldots, b_0)_r,$$

$$N=(n_{g-1}, n_{g-2}, \ldots, n_0)_r,$$

$$Y=(y_g, y_{g-1}, \ldots, y_0)_r,$$

$n'_0$,
$r=2^k$,
$R=r^g$, and the temporary variable of the r-adic one digit is tmp1, and carry variables are $c_3$ and $c_4$, the repeated processing of and j shown below make it possible to obtain an $ABR^{-1}$ mod N as the calculation in a single precision times single precision:

```
Y=0
for j=0 to g-1        ...............................
  (c_3,tmp1)_r =y_0 +a_0 *b_j
  m=tmp1*n'_0 mod r           : Pre-core processing
  (c_4,tmp1)_r =tmp1+m*n_0
  for i=1 to g-1       ...............................
    (c_3,tmp1)_r =yi +c_3 +a_i *b_j
    (c_4,y_{i-1})_r =tmp1+m*n_i +c_4   : Core processing
  next i              ...............................
  (c_4,c_3)_r =c_3 +c_4 +y_g
  y_{g-1} =c_3                    : Post-core processing
  y_g =c_4
next j               ...............................
if Y≧N then Y=Y−N           : Correction processing
if Y<N then return Y
```

FIG. 7 is the comprisal diagram of a modular multiplication calculation apparatus carrying out the core processing of the above described algorithm 6.

The modular multiplication calculation apparatus shown in FIG. 7 comprises a third product-sum calculation circuit 10b and a fourth product-sum calculation circuit 11b both for internally performing a multiplication and an addition; an A register 12 as a first register similar to the configuration shown in FIG. 4; a B register 13 as a second register; a Y register 15 as a third register; an N register 14 as a fifth register; an m register 16 and a selection circuit 19 both as a sixth register; a $c_3$ register 18c as a fourth register for retaining a carry variable $c_3$; and a $c_4$ register 18d as a seventh register for retaining a carry variable $c_4$.

Note that the internal configurations of the third product-sum calculation circuit 10b and fourth product-sum calculation circuit 11b are the same as the internal configuration of the first product-sum calculation circuit 10a, and each of the product-sum calculation circuits 10b and 11b is constituted by a k-bit multiplier 20, a 2k-bit adder 21 and a 2k-bit adder 22a.

Within the third product-sum calculation circuit 10b, the k-bit multiplier 20 multiplies the output of the A register 12 and that of the B register 13; the 2k-bit adder 21 adds the output of the k-bit multiplier 20 and that of the selection circuit 19 (i.e., the Y register 15); and the 2k-bit adder 22a adds the output $c_3$ of the 2k-bit adder 21 and that of the $c_3$ register 18c.

Note that the configuration example of FIG. 5A is such as to add the multiplication result to the output of the selection circuit 19 (i.e., the Y register 15) first and then add the output of the $c_3$ register 18c; it may alternatively be configured to add the output of the $c_3$ register 18c first and then add that of the selection circuit 19 (i.e., the Y register 15).

In the meantime, within the fourth product-sum calculation circuit 11b, the k-bit multiplier 20 multiplies the output of the N register 14 and that of the m register 16; the 2k-bit adder 21 adds the output of the k-bit multiplier 20 and the lower k-bit output of the third product-sum calculation circuit 10b; and the 2k-bit adder 22a adds the output of the 2k-bit adder 21 and that of the $c_4$ register 18d.

Note that the configuration example of FIG. 5A is such as to add the multiplication result to the lower k-bit output of the third product-sum calculation circuit 10b first and then add the output of the $c_4$ register 18d; it may alternatively be configured to add the output of the $c_4$ register 18d first and then add the lower k-bit output of the third product-sum calculation circuit 10b.

FIG. 8 is a description diagram showing the content of the core processing of the algorithm 6.

Within the third product-sum calculation circuit 10b, the output $a_i$ (k bits) of the A register 12 and the output $b_j$ (k bits) of the B register 13 are multiplied and the multiplication result (2k bits; 30) is added to the output (k bits; 31) of selection circuit 19 (i.e., the Y register 15) and the output (k bits; 32c) of the $c_3$ register 18c.

Note that the selection circuit 19 compares the value of j with "0" and, if the value of j is "0", outputs "0" to the third product-sum calculation circuit 10b, while, if the value of j is not "0", outputs the stored value $y_i$ of the Y register 15 to the third product-sum calculation circuit 10b.

The third product-sum calculation circuit 10b outputs the higher-order k bits (34) of the arithmetic operation result (2k bits) to the $c_3$ register 18c and the lower k bits (35) thereof to the fourth product-sum calculation circuit 11b. The $c_3$ register 18c stores the k-bit as a carry variable for use in the next cycle of arithmetic operations.

Within the fourth product-sum calculation circuit 11b, the output $n_i$ (k bits) of the N register 14 and the output m (k bits) of the m register 16 are multiplied and the multiplication result (2k bits; 36) is added to the lower k-bit output (35) of the third product-sum calculation circuit 10b and the k-bit output (32d) of the $c_4$ register 18d.

The fourth product-sum calculation circuit 11b outputs the higher-order k bits (38) of the arithmetic operation result (2k bits; 37) to the $c_4$ register 18d and the lower k bits (39) thereof to the Y register 15. The $c_4$ register 18d stores the k-bit as a carry variable for use in the next cycle of arithmetic operations. The Y register 15 stores the k-bit data as a value $y_{i-1}$.

FIG. 9 is the outline diagram of a flow chart exemplifying the modular multiplication processing by using the Montgomery method.

In the flow chart, the j loop corresponds to the loop processing of the algorithm 3. In the inside of the j loop, the partial multiplication of $A*b_j$ and $m*n$ in a multiple precision times single precision is carried out. The i loop is the part carrying out the calculations of a multiple precision times single precision of $A*b_j$ and $m*n$ by means of the partial multiplications in a single precision times single precision.

The following is a description of the specific example of the outline process flow including the processing, other than the core processing, in accordance with the algorithm 6.

In the following example, the assumption is that the bit length of N, A, and B are 1024 bits and the unit of processing is k=32, $R=2^{1024}$ and $r=2^{32}$

[Pre-Core Processing]

FIG. 10 is a diagram exemplifying the configuration for carrying out pre-core processing.

A register 41 retains the parameter $n'_0$ for use in a Montgomery calculation. A multiplication circuit 40 multiplies the output of a third product-sum calculation circuit 10b and that of a register 41. The pre-core processing initializes a $c_3$ register 18c, a $c_4$ register 18d and an m register 16a, which are used in the core processing. The third product-sum calculation circuit 10b first multiplies the respective inputs $a_0$ and $b_j$ from an A register 12 and a B register 13, and then adds the multiplication result to the input $y_0$ from a Y register 15.

Note that, if the same product-sum calculation circuit as in the core processing is used, the result is further added to "0".

Then, the third product-sum calculation circuit 10b stores the higher-order 32 bits of the result in the $c_3$ register 18c and outputs the lower 32 bits thereof to a fourth product-sum calculation circuit 11b and the multiplication circuit 40 used for calculating a parameter m.

The multiplication circuit 40 multiplies the output of the third product-sum calculation circuit 10b and the output $n'_0$ of the register 41 and outputs the lower 32 bits of the multiplication result to the m register 16a. The fourth product-sum calculation circuit 11b multiplies the input $n_0$ from an N register 14 and the value of the m register 16a and adds the multiplication result to the output of the third product-sum calculation circuit 10b.

Note that, if the same product-sum calculation circuit as in the core processing is used, the result is further added to "0".

Then the fourth product-sum calculation circuit 11b stores the higher-order 32 bits of the result in the $c_4$ register 18d. The lower 32 bits are not used.

[Core Processing]

FIG. 11 is a diagram exemplifying the configuration for carrying out the core processing that is i loop internal processing.

A Y register 15 is a register used for retaining the previous processing result and outputting the present processing result. A selection circuit 19 is equivalent to the processing of Y=0 in the algorithm 3. A third product-sum calculation circuit 10b first multiplies the respective inputs $a_i$ and $b_j$ from an A register 12 and a B register 13, adds the multiplication result to the input $y_i$ from the Y register 15 and further adds the addition result to the value of a $c_3$ register 18c. Then the third product-sum calculation circuit 10b stores the higher-order 32 bits of the addition result in the $c_3$ register 18c and outputs the lower 32 bits thereof to a fourth product-sum calculation circuit 11b.

The fourth product-sum calculation circuit 11b first multiplies the input $n_i$ from an N register 14 and the value of an m register 16a, adds the multiplication result to the output of the third product-sum calculation circuit 10b and further adds the addition result to the value of a $c_4$ register 18d. Then, the fourth product-sum calculation circuit 11b stores the higher-order 32 bits of the addition result in the $c_4$ register 18d and stores the lower 32 bits thereof in the $y_{i-1}$ of the Y register 15.

The processing of Y=Y/r is attained by storing the i-th turn calculation result in the $y_{i-1}$.

[Post-Core Processing]

FIG. 12 is a diagram exemplifying the configuration for carrying out post-core processing.

An addition circuit 45 adds the output of a $c_3$ register 18c, that of a $c_4$ register 18d and that of a selection circuit 19. A selection circuit 46 compares the carry output from the addition circuit 45 with "0" and "1", and outputs "0" to a Y register 15 if the carry output is "0", or outputs "1" thereto if the output is "1". The post-core processing carries out the processing of the values of the carry variables $c_3$ and $c_4$ after the core processing.

The processing is such as to input, to the addition circuit 45, the values of the $c_3$ register 18c and $c_4$ register 18d and the input $y_{32}$ from the Y register 15, to output the addition result to the $y_{31}$ of the Y register 15, to convert the carry into the value of 32 bits, which is the unit of processing, and to output the $y_{32}$ of the Y register 15. Here, as is clear from the output, although the value of $y_{32}$ is handled as 32-bit at the Y register 15, it is actually the value of 1 bit, and the addition result is within the range of 32 bits plus carry.

[Configuration of a Product-Sum Calculation Circuit]

FIG. 13 is a diagram exemplifying the configuration of the product-sum calculation circuit used in the configuration example described above.

Here, the configuration is such that all the unit of processing is 32-bit.

The product-sum calculation circuit comprises one 32-bit multiplier 51 and four 32-bit adders 52, 53, 54 and 55.

The input values of A and B are multiplied by the 32-bit multiplier 51 and thereby two parts, i.e., the higher-order32 bits and lower 32 bits, are output. The 32-bit adder 53 adds the lower 32-bit output of the 32-bit multiplier 51 to the value of an input R and outputs the 32-bit output of the addition result to the 32-bit adder 55 and the carry to the 32-bit adder 52. The 32-bit adder 52 adds the higher-order 32-bit output of the 32-bit multiplier 51 to the carry output of the 32-bit adder 53 and outputs the 32-bit output of the addition result to the 32-bit adder 54. It is theoretically proven that the aforementioned addition does not generate a carry. The 32-bit adder 55 adds the output of the 32-bit adder 53 to the value of an input C and outputs the 32-bit output of the addition result as the L output (i.e., the lower 32 bits) of the product-sum calculation circuit and outputs the carry to the 32-bit adder 54. The 32-bit adder 54 adds the output of the 32-bit adder 52 to the carry output of the 32-bit adder 55 and outputs the 32-bit output of the addition result as the H output (i.e., the higher-order 32 bits) of the product-sum calculation circuit. It is theoretically proven that the aforementioned addition does not generate a carry.

The entirety of the algorithms and circuits described above is noted in reference patent document 1.

The product-sum calculation circuit used in the conventional modular multiplication calculation apparatus described above is the product-sum calculation circuit with four inputs and two outputs as shown in FIG. 13. The product-sum calculation circuit performs the multiplication of two inputs and the addition of the multiplication and two remaining inputs. A common processor is not equipped with a four-input two-output product-sum calculation circuit and hence there is a problem that the two product-sum calculation circuits shown in FIG. 12 cannot be simplified. Further, the Pentium (registered trademark) processor is usually only equipped with a two-input two-output multiplier. Nonetheless, a performance degradation has not created a substantial problem in the case of implementing the function similar to the above described four-input two output product-sum calculation circuit by using the two-input two output multiplier and adder. Recent processors, represented by the Itanium2 processor, however, are equipped with a three-input two-output product-sum calculation circuit. Particularly, the Itanium2 processor is equipped with two pieces of three-input two-output product-sum calculation circuits. The algorithm using the conventional four-input two-output product-sum arithmetic operation described above, however, cannot bring out the capability, to the maximum, of such a processor equipped with three-input two-output product-sum calculation circuit.

Patent document 1: Laid-Open Japanese Patent Application Publication No. H11-212456

SUMMARY OF THE INVENTION

The problem for the present invention is to provide a highly efficient modular multiplication calculation apparatus and the related method, which employ a three-input two-output product-sum arithmetic operation suitable to the Montgomery method.

According to the present invention, a Montgomery method-use modular multiplication calculation apparatus for calculating a result Y by performing both a multiplication of certain values A and B and a residue calculation with a modulo N comprises: a first product-sum calculation unit for multiplying the value of certain one digit of the value A and the value of certain one digit of the value B by using three values as inputs, that is, the value of the certain one digit of the value A, the value of the value B and a carry value, and for outputting the result from adding the multiplication result to the carry value by dividing the addition result into two values, that is, the higher-order digit and lower digit as the new carry values of the calculation unit per se; a second product-sum calculation unit for multiplying the value of certain one digit of the modulo N and a certain value m by using three values, that is, the value of the certain one digit of the modulo N, the certain one digit value m and a carry value, as inputs, and for outputting the result from adding the multiplication result to the carry value by dividing it into two values, that is, the higher-order digit and lower digit as the new carry values of the calculation unit per se; and an addition unit for adding the lower digit of the output of the first product-sum calculation unit, the lower digit of the output of the second product-sum calculation unit and the carry value, for outputting the addition result by dividing it into two values, that is, the higher-order digit and lower digit both as the new carry values of the calculation unit per se, and storing the lower digit in certain one digit of a variable Y.

BRIEF DESCRIPTION OF DRAWINGS

FIG. 2A is the configuration diagram (part 1) of the conventional product-sum calculation circuit in the case of FIG. 1;

FIG. 2B is the configuration diagram (part 2) of the conventional product-sum calculation circuit in the case of FIG. 1;

FIG. 3 is a description diagram showing the content of the core processing of the conventional algorithm 4;

FIG. 5A is the configuration diagram (part 1) of the conventional product-sum calculation circuit in the case of FIG. 4;

FIG. 5B is the configuration diagram (part 2) of the conventional product-sum calculation circuit in the case of FIG. 4;

FIG. 6 is a description diagram showing the content of the core processing of the conventional algorithm 5;

FIG. 7 is the configuration diagram of a modular multiplication calculation apparatus carrying out the core processing of the conventional algorithm 6;

FIG. 10 is a diagram exemplifying the configuration for carrying out pre-core processing;

FIG. 11 is a diagram exemplifying the configuration for carrying out the core processing that is i loop internal processing;

FIG. 12 is a diagram exemplifying the configuration for carrying out post-core processing;

FIG. 13 is a diagram exemplifying the configuration of the conventional product-sum calculation circuit;

FIG. 14 is the configuration diagram of a modular multiplication calculation apparatus carrying out the core processing of an algorithm according to a preferred embodiment of the present invention;

FIG. 16 is a diagram showing the configuration of an apparatus for performing the post-core processing of an algorithm according to a preferred embodiment of the present invention.

DESCRIPTION OF THE PREFERRED EMBODIMENTS

Figure 1:
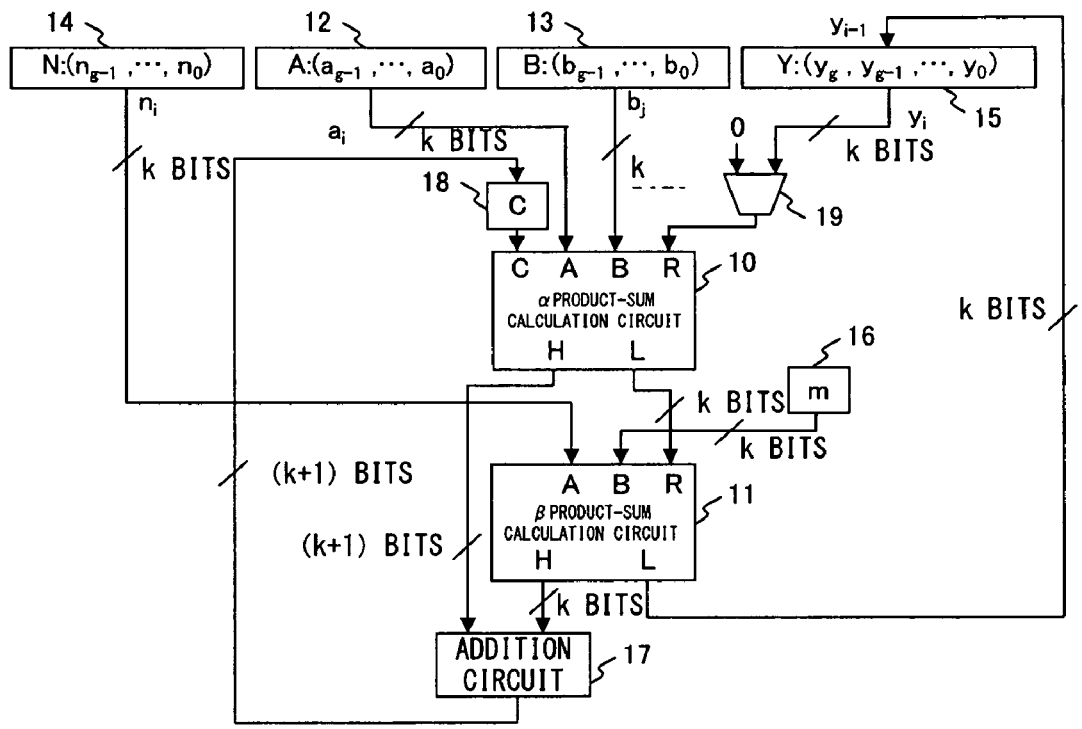
FIG. 1 is the configuration diagram of a modular multiplication calculation apparatus executing the core processing of the conventional algorithm 4.
Figure 4:
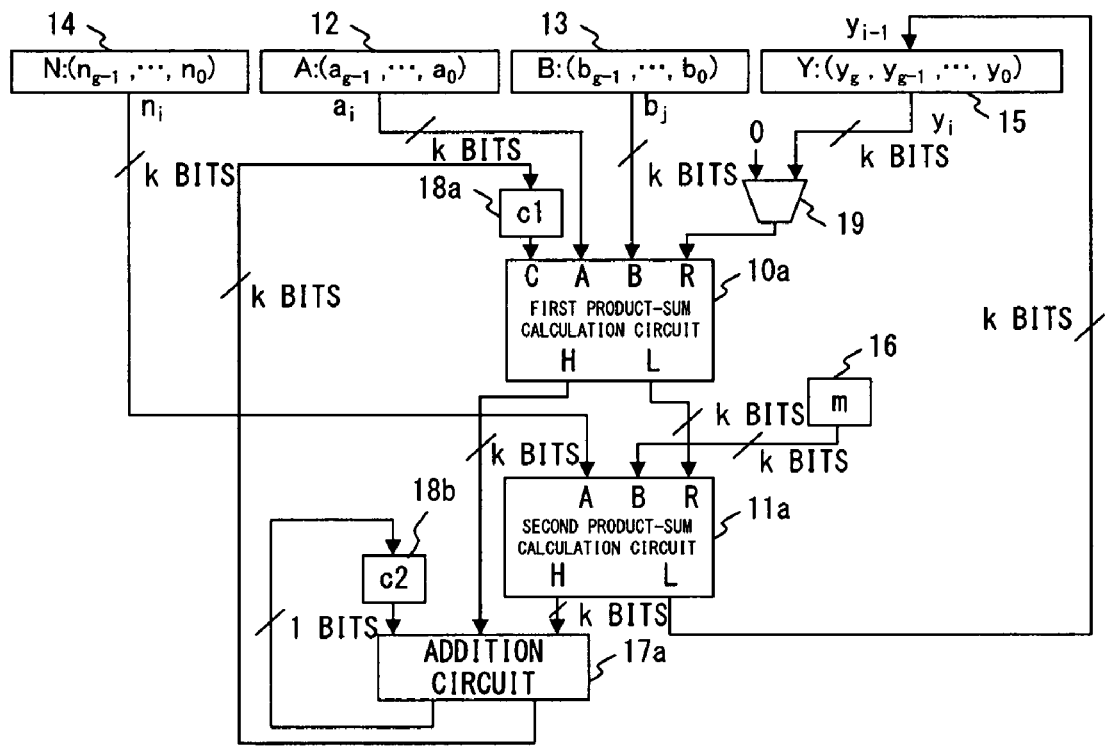
FIG. 4 is the configuration diagram of a modular multiplication calculation apparatus carrying out the core processing of the conventional algorithm 5.
Figure 8:
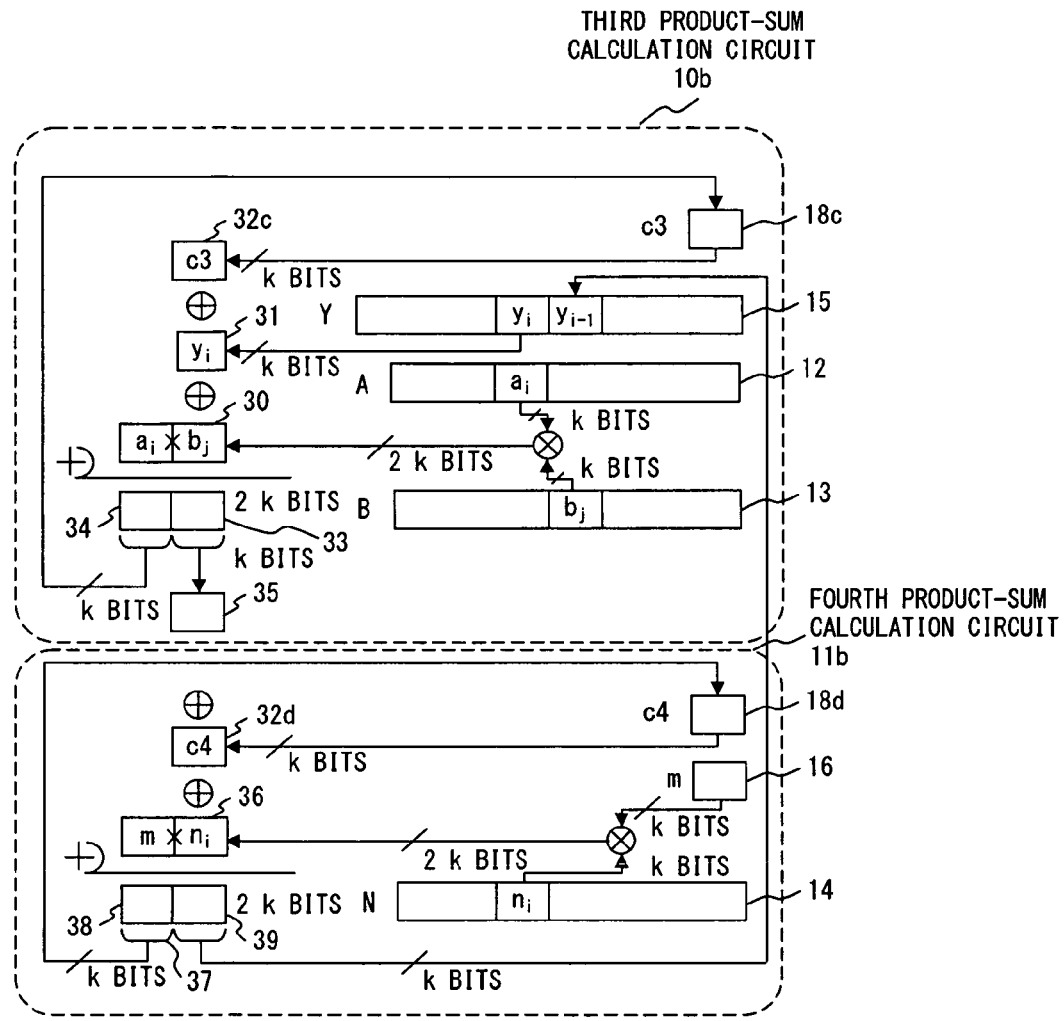
FIG. 8 is a description diagram showing the content of the core processing of the conventional algorithm 6.
Figure 9:
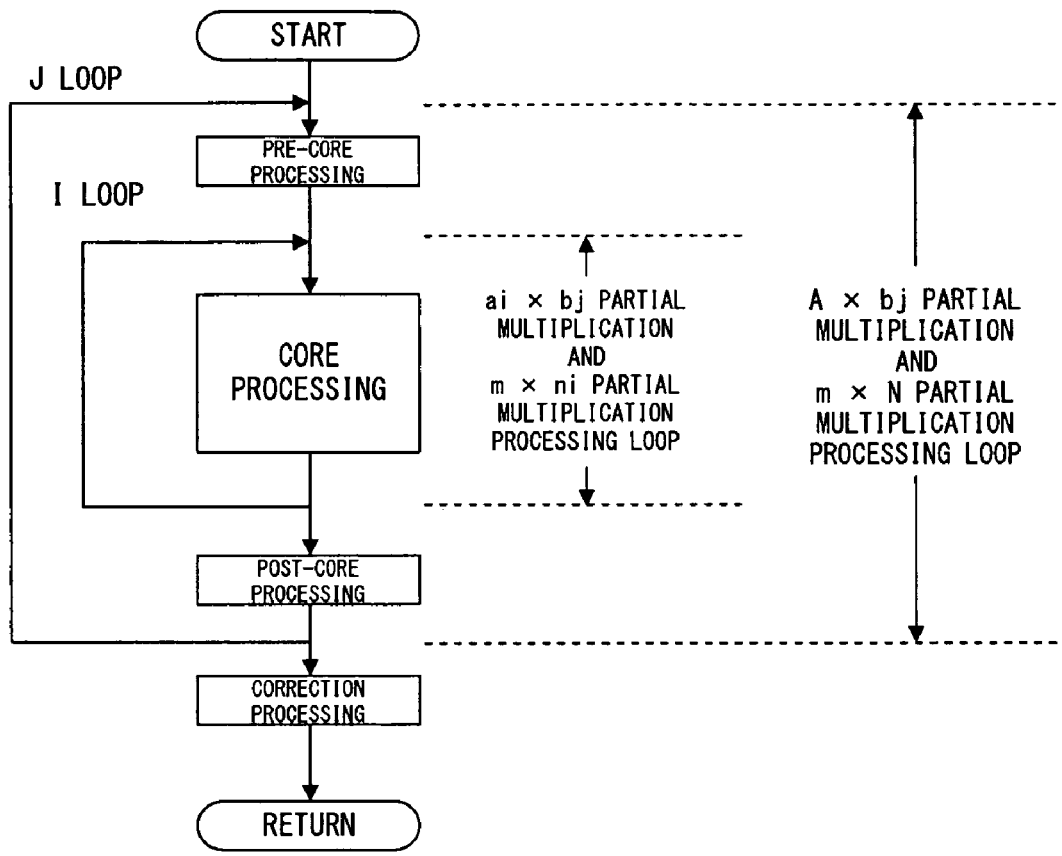
FIG. 9 is the outline diagram of a flow chart exemplifying the modular multiplication processing by using the Montgomery method.

A preferred embodiment of the present invention provides an arithmetic operation circuit which utilizes a product-sum calculation circuit having three inputs and two outputs (noted as "three-input two-output product-sum calculation circuit" hereinafter) for use in the Montgomery method.

The following is a description of the preferred embodiment of the present invention suitable to a three-input two-output product-sum calculation circuit.

The embodiment of the present invention is configured to carry out an algorithm in the core processing part of the above described algorithm 6 by using a three-input two-output product-sum calculation circuit. The arithmetic operation circuit executing the algorithm of the embodiment of the present invention returns the higher-order k-bit output from a first product-sum calculation circuit thereto as a carry variable $c_1$ and returns the higher-order k-bit output from a second product-sum calculation circuit thereto as a carry variable $c_2$. The arithmetic operation circuit separates (k+2) bits, which is the output result of an addition circuit, into the higher-order 2 bits and lower k bits and returns the higher-order 2 bits to the addition circuit as a carry variable $c_3$. The following is the algorithm in this case.

[Algorithm]

Where two numbers A and B to be multiplied together, a parameter N, a Montgomery multiplication parameter $n'_0$ and an output-use variable Y each is an r-adic number and if they are represented by:

$$A=(a_{g-1}, a_{g-2}, \ldots, a_0)_r,$$

$$B=(b_{g-1}, b_{g-2}, \ldots, b_0)_r,$$

$$N=(n_{g-1}, n_{g-2}, \ldots, n_0)_r,$$

$$Y=(y_g, y_{g-1}, \ldots, y_0)_r,$$

$n'_0$,
$r=2^k$,
$R=r^g$, and where r-adic one digit temporary variables are tmp1 and tmp2, and carry variables are $c_1$, $c_2$ and $c_3$, the repetition processing of i and j shown below makes it possible to obtain $ABR^{-1}$ mod N as a calculation in a single precision times single precision:

```
Y=0
   for j=0 to g-1                    .................
      (c_1,tmp1)_r =a_0*b_j+y_0
      m=tmp1*n'_0 mod r
      (c_2,tmp1)_r =tmp1+m*n_0        : Pre-core processing
      c_3=0
      for i=1 to g-1                  .................
         (c_1,tmp1)_r = a_i*b_j+c_1
         (c_2,tmp2)_r =m*n_i+c_2       : Core processing
         (c_3,y_{i-1})_r = tmp1+tmp2+c_3+y_i
      next i                          .................
      (c_2,c_1)_r =c_1+c_2+c_3+y_g
      y_{g-1}=c_1                     : Post-core processing
      y_g=c_2
   next j                             .................
   if Y≧N then Y=Y-N                  : Correction processing
   if Y<N then return Y
```

Here, $(\ )_r$ indicates that the variable of the r-adic one digit within the parentheses is handled as a multiple precision. While the carry variable $c_2$ is expressed by the r-adic one digit, the content is one-bit value.

FIG. 14 is the configuration diagram of a modular multiplication calculation apparatus carrying out the core processing of an algorithm according to the embodiment of the present invention.

The modular multiplication calculation apparatus shown in FIG. 14 comprises a product-sum calculation circuit 60 and a product-sum calculation circuit 61, each of which internally performs multiplication and addition; an addition circuit 62; an A register 63 as a first register for retaining numbers A ($a_{g-1}$, $a_{g-2}$, . . . , $a_0$) as multipliers (or multiplicands); a B register 64 as second register for retaining numbers B ($b_{g-1}$, $b_{g-2}$, . . . , $b_0$) as multipliers (or multiplicands); a Y register as a third register for retaining the lower k-bit output of the previous arithmetic operation result of the addition circuit 62 and storing the lower k-bit output of the present arithmetic operation thereof; an m register 66 as a fourth register for retaining a parameter m for a Montgomery's algorithm; an N register 67 as a fifth register for retaining modulo N ($n_{g-1}$, $n_{g-2}$, . . . , $n_0$); a $c_1$ register 68 as a sixth register for retaining a carry variable $c_1$; a $c_2$ register 69 as a seventh register for retaining a carry variable $c_2$; a $c_3$ register 70 as an eighth register for retaining a carry variable $c_3$; and a selection circuit 71 for selecting an output by comparing the value of j with "0".

Note that, in FIG. 14, each of A, B, C, H and L of both the product-sum calculation circuits 60 and 61 is k bits. The "k" of the k bits is the number of bits to be used when the processor used for an arithmetic operation expresses a number of a single precision, with the k being "32" in the case of a 32-bit processor. The product-sum calculation result, i.e., 2k bits, of A*B+C is expressed by (H,L), with H being the higher-order k bits and L being the lower k bits. Also in FIG. 14, for the addition circuit 62, each of A, B, C, D and L is k-bit, while only H is 2 bits (in the case of software, the H is also k bits). The addition result of A+B+C+D, i.e., (k+2) bits, is expressed by (H,L), with H being the higher-order 2 bits (in the case of software, the H is also k bits) and L being the lower k bits. Note that the addition circuit 63 may not necessarily use a four-input two-output addition circuit. That is, the arithmetic operation of an addition has a smaller calculation volume than that the arithmetic operation of a multiplication, thereby influencing less to the time and load required for an arithmetic operation employing a Montgomery method. Therefore, as an example, even the configuration of an addition circuit by combining a two-input two-output addition circuits will not cause a large influence on the performance of the algorithm according to the present invention. Accordingly, although the addition circuit uses four-input two-output addition circuits in the configuration of FIG. 14, such a configuration scheme is not specified herein. A use of three pieces of two-input two-output addition circuits makes it possible to attain a circuit similar to the addition circuit 62. Such addition calculation may be configured variously, such as a use of an add instruction with a carry.

In FIG. 14, the product-sum calculation circuit 60 receives inputs, i.e., one digit of A, that of B and that of a carry, calculates a product and a sum, and outputs the answer as an (H,L). That is, the product-sum calculation circuit 60 calculates $(c_1, tmp1)=a_i*b_j+c_1$ among the core processing of the above described algorithm according to the preferred embodiment of the present invention. The product-sum calculation circuit 61 receives inputs, i.e., one digit m, one digit of N and one digit of a carry, calculates a product and a sum and outputs the answer as an (H,L). That is, the product-sum calculation circuit 61 calculates $(c_2, tmp2)=m*n_j+c_2$ among the core processing of the above described algorithm according to the preferred embodiment of the present invention.

The addition circuit 62 receives inputs, i.e., the lower k bits of the arithmetic operation result of the product-sum calculation circuit 60, the lower k bits of the arithmetic operation result of the product-sum calculation circuit 61, one digit of Y, one digit of carry, and stores the lower k bits of the arithmetic operation result in the Y. That is, the addition circuit 62 calculates $(c_3, y_{i-1})=tmp1+tmp2+c_3+y_i$.

Note that the product-sum calculation circuits 60 and 61 preferably perform parallelly by using two pieces of three-input two-output product-sum calculation circuits, and the product-sum calculation circuits 60 and 61 preferably perform the next cycle of arithmetic operations while the addition circuit performs an arithmetic operation.

Additionally, the following shows the configuration of a modular multiplication calculation apparatus carrying out pre-core processing and post-core processing, which is the same as in the case of the algorithm 6 because the algorithm according to the preferred embodiment of the present invention is a modified configuration of the algorithm 6 of the conventional technique.

Figure 15:
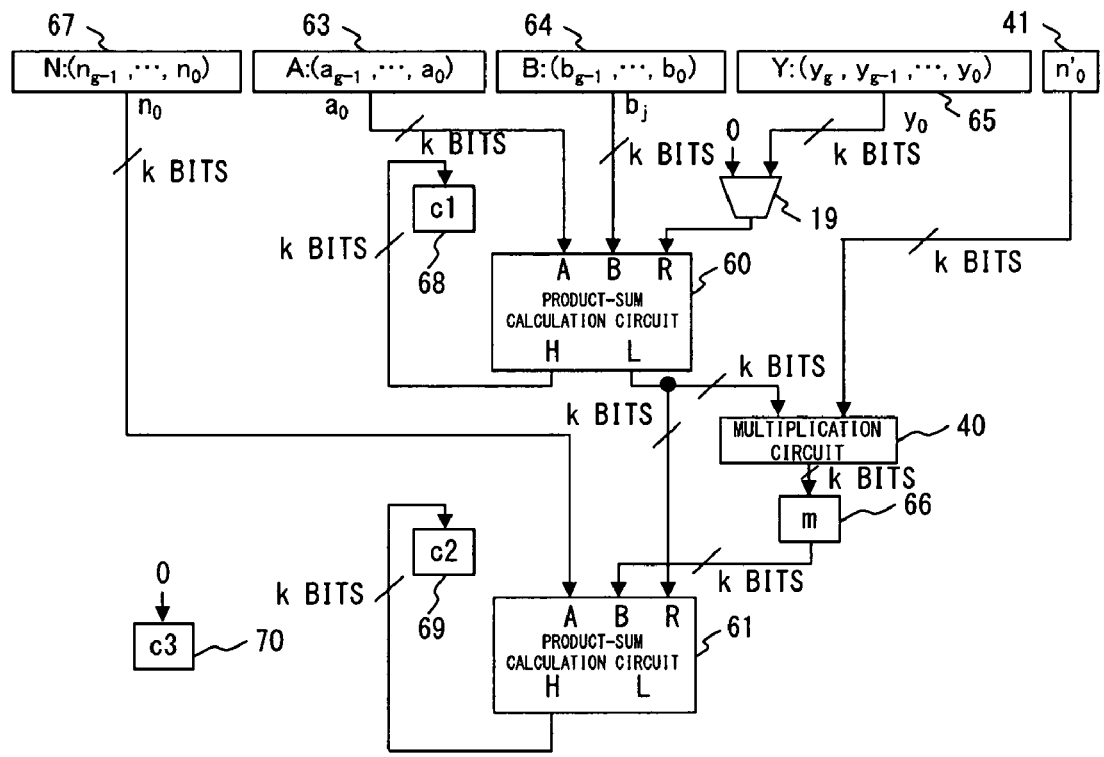
FIG. 15 is a diagram showing the configuration of an apparatus for performing the pre-core processing of an algorithm according to a preferred embodiment of the present invention.

FIG. 15 is a diagram showing the configuration of an apparatus for performing the pre-core processing of the algorithm according to the preferred embodiment of the present invention.

A register 41 retains a Montgomery calculation-use parameter $n'_0$. A multiplication circuit 40 multiples the output of a product-sum calculation circuit 60. The pre-core processing initializes a $c_1$ register 68, a $c_2$ register 69, a $c_3$ register 70 and an m register 66. The product-sum calculation circuit 60 first multiplies the respective inputs $a_0$ and $b_j$ from an A register 63 and a B register 64, and adds the multiplication result to the input $y_i$ from a Y register 65.

Then, the product-sum calculation circuit 60 stores the higher-order k bits of the multiplication result in the $c_1$ register 68 and outputs the lower k bits thereof to a product-sum calculation circuit 61 and the multiplication circuit 40 for calculating a parameter m.

The multiplication circuit 40 multiplies the output of the product-sum calculation circuit 60 and that of the register 41, and outputs the lower k bits of the multiplication result to the m register 66. The product-sum calculation circuit 61 multiplies the input $n_0$ and the value of the m register 66, and adds the multiplication result to the output of the product-sum calculation circuit 60. Then it stores the higher-order k bits of the addition result in the $c_2$ register 69. The lower k bits are not used.

The arithmetic operation apparatus employed for the above described pre-core processing also uses the three-input two-output product-sum calculation circuit. In the case of the conventional algorithm, when a pre-core processing uses the same product-sum calculation circuit as the configuration used for the core processing, one of four inputs is set as "0", whereas the embodiment of the present invention does not need such a setup because the product-sum circuits used here each has three inputs and two outputs.

Further, the pre-core processing needs to perform the processing of the product-sum calculation circuit 61 after the processing of the product-sum calculation circuit 60, and therefore the product-sum calculation circuits 60 and 61 cannot be operated in parallel as in the core processing. Therefore, comprising two pieces of three-input two-output product-sum calculation circuits, only a lower effect is gained in the pre-core processing than in the core processing, and yet the three-input two-output product-sum calculation circuits can be effectively used.

FIG. 16 is a diagram showing the configuration of an apparatus for performing the post-core processing of the algorithm according to the preferred embodiment of the present invention.

An addition circuit 45 adds the respective outputs of $c_1$ register 68, $c_2$ register 69, $c_3$ register 70 and selection circuit 71. A selection circuit 46 compares the carry output of the addition circuit 45 with "0" and "1", and outputs "0" to a Y register 65 if the carry output is "0", while outputs "1" thereto if it is "1". This post-core processing processes the respective values of carry variables $c_1$, $c_2$ and $c_3$ after the completion of the core processing.

The respective values of the $c_1$ register 68, $c_2$ register 69 and $c_3$ register 70 and the input $y_g$ from the Y register 65 are input into the addition circuit 45; the addition result is output to the $y_{g-1}$ of the Y register 15; a carry is converted into a k-bit value which is the unit of processing; and the conversion result is output to the $y_g$ of the Y register 65. Here, as is clear from the output, while the value of $y_g$ is handled as k bits at the Y register 65, it is actually 1 bit value and therefore the addition result is within the range of k bits plus carry.

The above described preferred embodiment of the present invention has attained four times of processing speed in a processor, represented by the Itanium2 processor, which comprises the inputs of three variables and a product-sum calculation instruction so as to return an arithmetic operation result by way of two outputs, as compared to the configuration according to the conventional method. This owes to the paralleling of the product-sum calculation circuits 61 and 62, and to the shortening of a propagation delay time by virtue of the paralleling. The three-input two-output product-sum calculation circuit according to the present invention is also applicable to a configuration in which the product-sum calculation circuits 61 and 62 are serially connected together as in the conventional method.

As described above, the present invention is contrived to attain a Montgomery method-use modular multiplication calculation apparatus which is suitable to an arithmetic operation apparatus comprising three-input two-output product-sum calculation circuits. Likewise, it can be expected that high speed processing is enabled when incorporating the present invention in a digital signal processor (DSP) comprising a similar product-sum calculation circuit.

What is claimed is:

1. A Montgomery method-use modular multiplication calculation apparatus for calculating a result Y by performing both a multiplication of certain values A and B and a residue calculation with a modulo N, the Montgomery method-use modular multiplication calculation apparatus comprising:

a first product-sum calculation unit configured to multiply the value of certain one digit of the value A and the value of certain one digit of the value B by using three values as inputs, which are the value of the certain one digit of the value A, the value of the certain one digit of the value B and a first carry value, and configured to output a first result from adding the multiplication result to the first carry value by dividing the first result into two values, which are a higher-order digit as new first carry values of the first product-sum calculation unit and a lower digit unit;

a second product-sum calculation unit configured to multiply the value of certain one digit of the modulo N and a certain one digit value m by using three values as inputs, which are the value of the certain one digit of the modulo N, the certain one digit value m and a second carry value, and configured to output a second result from adding the multiplication result to the second carry value by dividing the second result into two values, which are a higher-order digit as new second carry values of the second product-sum calculation unit and a lower digit; and an addition unit configured to add the lower digit of the output of the first product-sum calculation unit, the lower digit of the output of the second product-sum calculation unit and a third carry value, configured to output the addition result by dividing it the addition result into two values, which are a higher-order digit as a new third carry value of the addition unit and a lower digit, and configured to store the lower digit in certain one digit of a variable Y.

2. The Montgomery method-use modular multiplication calculation apparatus according to claim 1, wherein an arithmetic operation of the first product-sum calculation unit and that of the second product-sum calculation unit are carried out in parallel.

3. The Montgomery method-use modular multiplication calculation apparatus according to claim 1 is used for an arithmetic operation in a public key cryptographic system.

4. The Montgomery method-use modular multiplication calculation apparatus according to claim 1, wherein the-one digit values of the input and output in arithmetic operations performed by the first product-sum calculation unit and the second product-sum calculation unit consist of a number of bits used in the case of a processor expressing a numeral value in a single precision.

5. The Montgomery method-use modular multiplication calculation apparatus according to claim 1, wherein the first product-sum calculation unit and the second product-sum calculation unit perform arithmetic operations for the next time while the addition unit performs an arithmetic operation.

6. The Montgomery method-use modular multiplication calculation apparatus according to claim 1, further comprising:

a third product-sum calculation unit for configured to multiply the value of the lowest one digit of the value A and the value of certain one digit of the value B by using, as inputs, the value of the lowest one digit of the value A, the value of certain one digit of the value B and one digit of a variable Y, which store a result, configured to add the multiplication result to the one digit of the variable Y and configured to output the addition result in two values, which are the value of the higher-order digit as the initial value of the first carry value to the first product-sum calculation unit and the lower digit value;

a multiplication unit configured to multiply inputs, which are the lower digit of the output of the third product-sum calculation unit and a Montgomery method-use parameter, and configured to output a result; and a fourth product-sum calculation unit configured to multiply certain one digit of the modulo N and the output of the multiplication unit by using three values as inputs, which are the lower digit of the output of the third product-sum calculation unit, the output of the multiplication unit and certain one digit of the modulo N, configured to add the multiplication result to the lower digit of the output of the third product-sum calculation unit, and configured to output the higher-order digit of the addition result as the initial value of the second carry value to the second product-sum calculation unit.

7. The Montgomery method-use modular multiplication calculation apparatus according to claim 1, further comprising a second addition unit configured to add inputs, being carry values, which are the respective outputs of the first product-sum calculation unit, the second product-sum calculation unit and the addition unit, and the value of the highest digit of the variable Y after the arithmetic operation of the addition unit, and configured to store both the higher-order digit of the addition result in the highest digit of the variable Y and the lower digit thereof in the second digit from the top of the variable Y.

8. A Montgomery method-use modular multiplication calculation method for calculating, using a processor, a result Y by performing both a multiplication of certain values A and B and a residue calculation with a modulo N, the Montgomery method-use modular multiplication calculation method comprising:

(a) multiplying, using the processor, the value of certain one digit of the value A and the value of certain one digit of the value B by using three values as inputs, which are the value of the certain one digit of the value A, the value of the certain one digit of the value B and a first carry value, and outputting a first result from adding the multiplication result to the first carry value by dividing the first result into two values, which are a higher-order digit as new first carry values and a lower digit;

(b) multiplying, using the processor, the value of certain one digit of the modulo N and a certain one digit value m by using three values as inputs, which are the value of the certain one digit of the modulo N, the certain one digit value m and a second carry value, and outputting a second result from adding the multiplication result to the second carry value by dividing the second result into two values, which are a higher-order digit as new second carry values and a lower digit; and (c) adding, using a processor, the lower digit of the output of the step (a), the lower digit of the output of the step (b) and a third carry value, outputting the addition result by dividing it the addition result into two values, which are a higher-order digit as a new third carry value and a lower digit, and storing the lower digit in certain one digit of a variable Y.

9. A non-transitory computer-readable recording medium having stored therein a program for making a computer execute a Montgomery method-use modular multiplication calculation process for calculating a result Y by performing both a multiplication of certain values A and B and a residue calculation with a modulo N, the process comprising:

(a) multiplying the value of certain one digit of the value A and the value of certain one digit of the value B by using three values as inputs, which are the value of the certain one digit of the value A, the value of the certain one digit of the value B and a first carry value, and outputting a first result from adding the multiplication result to the first carry value by dividing the first result into two values, which are a higher-order digit as new first carry values and a lower digit;

(b) multiplying the value of certain one digit of the modulo N and a certain one digit value m by using three values as inputs, which are the value of the certain one digit of the modulo N, the certain one digit value m and a second carry value, and outputting a second result from adding the multiplication result to the second carry value by dividing the second result into two values, which are a higher-order digit as new second carry values and a lower digit; and (c) adding the lower digit of the output of the step (a), the lower digit of the output of the step (b) and a third carry value, outputting the addition result by dividing the addition result into two values, which are a higher-order digit as a new third carry value and lower digit, and storing the lower digit in certain one digit of a variable Y.

10. An apparatus performing a modular multiplication calculation by means of a single precision (k bits) arithmetic operation of a processor using a Montgomery's algorithm, the apparatus comprising:

a first product-sum calculation circuit configured to perform a product and sum arithmetic operation and configured to output the operation result by dividing it into the higher-order k bits and lower k bits;

a second product-sum calculation circuit configured to perform a product and sum arithmetic operation and configured to output the operation result by dividing it into the higher-order k bits and lower k bits;

an addition circuit configured to perform an addition arithmetic operation and configured to output the operation result by dividing it into the higher-order two bits and lower k bits;

first and second registers configured to retain two numbers to be multiplied together at the first product-sum calculation circuit;

a third register configured to retain the lower k-bit output of the addition circuit and configured to store a k-bit input of the addition circuit for the next operation;

a fourth register configured to retain the value of a parameter for the Montgomery's algorithm;

a fifth register configured to retain a modulo;

a sixth register configured to retain the higher-order k-bit output of the first product-sum calculation circuit and configured to store a number which constitutes an input to be added in the next operation of the first product-sum calculation circuit;

a seventh register configured to retain the higher-order k-bit output of the second product-sum calculation circuit and configured to store a number which constitutes an input to be added in the next operation of the second product-sum calculation circuit; and an eighth register configured to retain the higher-order two-bit output of the addition circuit and configured to store a number which constitutes an input to be added in the next operation of the addition circuit, wherein the first product-sum calculation circuit arithmetically operates a multiplication of the values of predetermined bits of two numbers retained in the first and second registers, an addition of the multiplication result and the value retained in the sixth register; the second product-sum calculation circuit arithmetically operates a multiplication of the value retained in the fourth register and the value of a predetermined bit of the number retained in the fifth register, an addition of the multiplication result and the value retained in the seventh register; and the addition circuit arithmetically operates an addition of the lower k-bit output of the first product-sum calculation circuit, the lower k-bit output of the second product-sum calculation circuit, the value of a predetermined bit retained in the third register and the value retained in the eighth register.

11. The modular multiplication calculation apparatus using the Montgomery method according to claim 10, wherein the first product-sum calculation circuit multiplies the values of predetermined bits of two numbers retained in the first and second registers and adds the multiplication result to the value retained in the sixth register.

12. The modular multiplication calculation apparatus using the Montgomery method according to claim 10, wherein the second product-sum calculation circuit multiplies the value retained in the fourth register and the value of a predetermined bit retained in the fifth register and adds the multiplication result to the value retained in the seventh register.

13. The modular multiplication calculation apparatus using the Montgomery method claim 10, wherein the first and second product-sum calculation circuits each performs an arithmetic operation of the next operation during an arithmetic operation performed by the addition circuit.

14. The modular multiplication calculation apparatus using the Montgomery method according to claim 10, performing pipeline processing so that the first and second product-sum calculation circuits each performs an arithmetic operation of the next operation during an arithmetic operation performed by the addition circuit.

15. The modular multiplication calculation apparatus using the Montgomery method according to claim 10, wherein the respective higher-order outputs of the first and second product-sum calculation circuits are handled as the respective carrier inputs of the circuits for the next operation.

16. The modular multiplication calculation apparatus using the Montgomery method according to claim 10, wherein the first and second product-sum calculation circuits each comprises a unit for multiplying two k-bit numbers together and a unit for adding the multiplication result to one k-bit number.

* * * * *

UNITED STATES PATENT AND TRADEMARK OFFICE
CERTIFICATE OF CORRECTION

PATENT NO. : 8,352,529 B2
APPLICATION NO. : 12/218060
DATED : January 8, 2013
INVENTOR(S) : Kazuyoshi Furukawa et al.

It is certified that error appears in the above-identified patent and that said Letters Patent is hereby corrected as shown below:

In the Claims:
Column 19, Line 12-13, In Claim 1, delete "digit unit;" and insert -- digit; --, therefor.
Column 19, Line 29, In Claim 1, after "dividing" delete "it".
Column 19, Line 43, In Claim 4, after "wherein" delete "the-".
Column 19, Line 57, In Claim 6, after "unit" delete "for".
Column 20, Line 54, In Claim 8, after "dividing" delete "it".
Column 22, Line 33, In Claim 13, delete "method claim 10," and insert -- method according to claim 10, --, therefor.

Signed and Sealed this
Thirtieth Day of April, 2013

Teresa Stanek Rea
*Acting Director of the United States Patent and Trademark Office*